US010040368B2

(12) United States Patent
Oguma et al.

(10) Patent No.: US 10,040,368 B2
(45) Date of Patent: Aug. 7, 2018

(54) POWER SUPPLY SYSTEM, TRANSPORTATION DEVICE, AND POWER TRANSMISSION METHOD INCLUDING CHANGING A PROPORTION OF A CHARGING PROWER

(71) Applicant: HONDA MOTOR CO., LTD., Tokyo (JP)

(72) Inventors: Hirokazu Oguma, Wako (JP); Daijiro Takizawa, Wako (JP); Ryota Unno, Wako (JP)

(73) Assignee: HONDA MOTOR CO., LTD., Tokyo (JP)

( * ) Notice: Subject to any disclaimer, the term of this patent is extended or adjusted under 35 U.S.C. 154(b) by 0 days.

(21) Appl. No.: 15/356,666

(22) Filed: Nov. 21, 2016

(65) Prior Publication Data
US 2017/0151888 A1  Jun. 1, 2017

(30) Foreign Application Priority Data
Nov. 28, 2015 (JP) ................................. 2015-232507

(51) Int. Cl.
*H02J 7/00* (2006.01)
*B60L 11/18* (2006.01)
(Continued)

(52) U.S. Cl.
CPC .......... *B60L 11/1868* (2013.01); *B60L 11/08* (2013.01); *B60L 11/1809* (2013.01); *H02M 7/44* (2013.01); *H02M 7/53875* (2013.01); *H02P 4/00* (2013.01)

(58) Field of Classification Search
CPC .. B60L 11/1868; B60L 11/08; B60L 11/1809; H02M 7/44; H02M 7/53875; H02P 4/00
(Continued)

(56) References Cited

U.S. PATENT DOCUMENTS

2016/0288663 A1* 10/2016 Hikiri ....................... B60L 7/16

FOREIGN PATENT DOCUMENTS

| JP | 2015-070726 | 4/2015 |
| WO | WO 2013/038441 | 3/2015 |
| WO | WO 2015/071970 | 5/2015 |

OTHER PUBLICATIONS

Japanese Office Action for corresponding JP Application No. 2015-232507, dated Aug. 8, 2017 (w/ English machine translation).

* cited by examiner

*Primary Examiner* — Nathaniel Pelton
(74) *Attorney, Agent, or Firm* — Mori & Ward, LLP

(57) ABSTRACT

A power supply system includes a first energy storage, a second energy storage, a power transmitter, and circuitry. The power transmitter is disposed among an electric load, the first energy storage, and the second energy storage. The electric load is configured to output a regenerative power while no power is supplied to the electric load. The regenerative power includes a first charging power charged in the first energy storage and a second charging power charged in the second energy storage. The circuitry is configured to acquire at least one of a regeneration index value and a remaining capacity value. The circuitry is configured to control the power transmitter to change a proportion of the first charging power and the second charging power in accordance with at least one of the regeneration index value and the remaining capacity value.

24 Claims, 20 Drawing Sheets

(51) Int. Cl.
*B60L 11/08* (2006.01)
*H02M 7/44* (2006.01)
*H02P 4/00* (2006.01)
*H02M 7/5387* (2007.01)

(58) Field of Classification Search
USPC .......................................................... 320/104
See application file for complete search history.

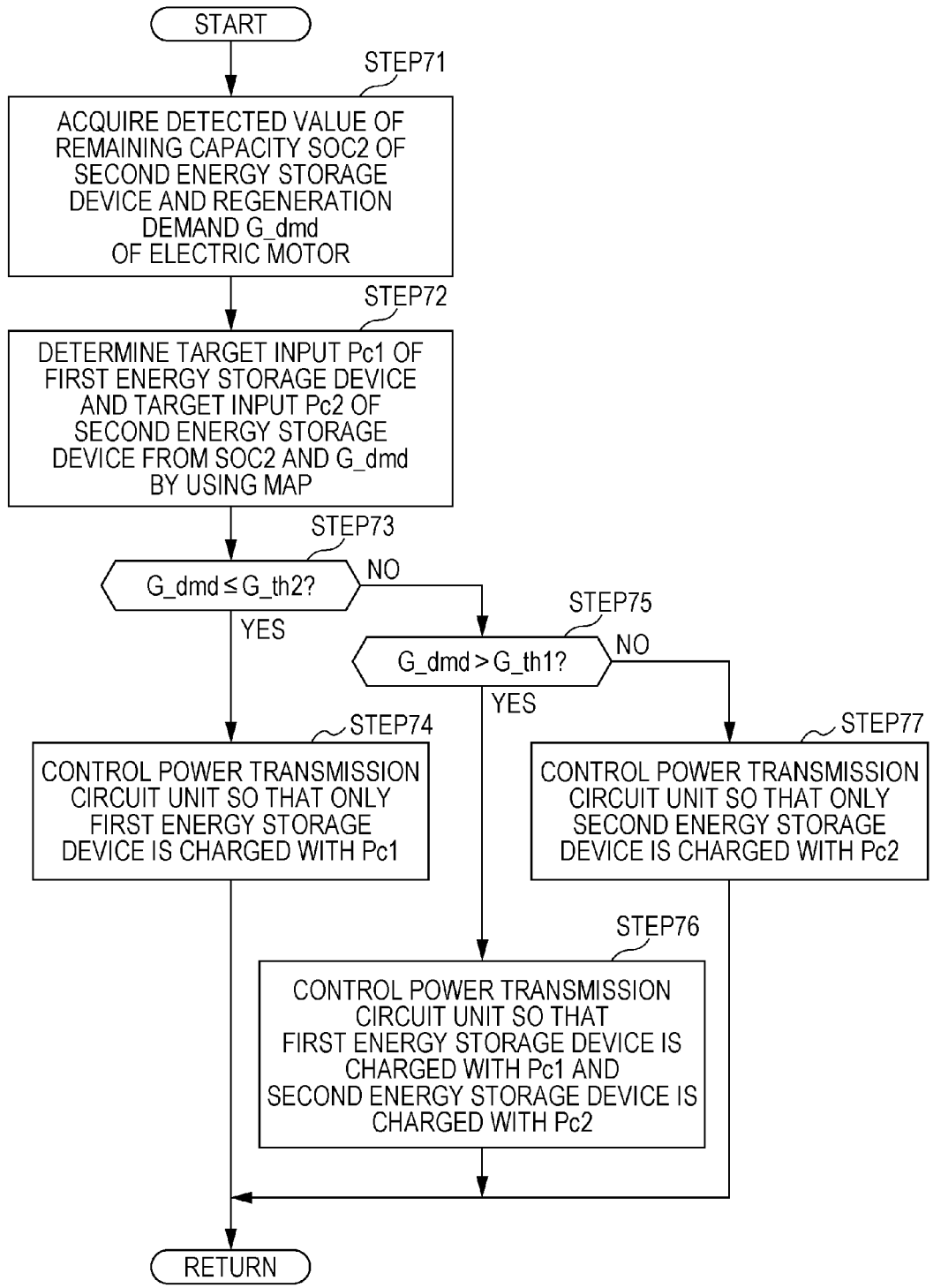

POWER SUPPLY SYSTEM, TRANSPORTATION DEVICE, AND POWER TRANSMISSION METHOD INCLUDING CHANGING A PROPORTION OF A CHARGING PROWER

CROSS-REFERENCE TO RELATED APPLICATIONS

The present application claims priority under 35 U.S.C. § 119 to Japanese Patent Application No. 2015-232507, filed Nov. 28, 2015, entitled "Power Supply System, Transportation Device, and Power Transmission Method." The contents of this application are incorporated herein by reference in their entirety.

BACKGROUND

1. Field

The present disclosure relates to a power supply system, a transportation device, and a power transmission method.

2. Description of the Related Art

Power supply systems of this type, disclosed in Japanese Unexamined Patent Application Publication No. 2015-070726 and International Publication No. WO2013/038441, for example, are known in the related art. Japanese Unexamined Patent Application Publication No. 2015-070726 discloses a system for supplying power to an electric motor for a vehicle by using two energy storage devices, namely, a high-capacity energy storage device having a relatively high capacity and a high-power energy storage device having a relatively high upper limit on power that can be output.

International Publication No. WO2013/038441 discloses a system for supplying power mainly from a high-capacity energy storage device to an electric motor with the remaining capacity of a high-power energy storage device being kept at a reference value.

SUMMARY

According to one aspect of the present invention, a power supply system includes a first energy storage, a second energy storage, a power transmitter, and circuitry. The first energy storage has a first power density and a first energy density. The second energy storage has a second power density higher than the first power density and has a second energy density lower than the first energy density. The power transmitter is disposed among an electric load, the first energy storage, and the second energy storage so as to control power transmission among the electric load, the first energy storage, and the second energy storage. The electric load is activated with power supplied from at least one of the first energy storage and the second energy storage. The electric load is configured to output a regenerative power while no power is supplied to the electric load. The regenerative power includes a first charging power charged in the first energy storage and a second charging power charged in the second energy storage. The circuitry is configured to acquire at least one of a regeneration index value and a remaining capacity value. The regeneration index value indicates a magnitude of the regenerative power. The remaining capacity value indicates a remaining capacity of the second energy storage. The circuitry is configured to control the power transmitter to change a proportion of the first charging power and the second charging power in accordance with at least one of the regeneration index value and the remaining capacity value.

According to another aspect of the present invention, a power transmission method for power transmission among an electric load, a first energy storage, and a second energy storage, the power transmission method includes acquiring at least one of a regeneration index value and a remaining capacity value. The regeneration index value indicates a magnitude of a regenerative power of the electric load. The remaining capacity value indicates a remaining capacity of the second energy storage. The regenerative power includes a first charging power charged in the first energy storage and a second charging power charged in the second energy storage. A proportion of the first charging power and the second charging power is changed in accordance with at least one of the regeneration index value and the remaining capacity value.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings.

FIG. 22 is a flowchart illustrating a control process for the control device during the regenerative operation of the electric motor (third embodiment).

DESCRIPTION OF THE PREFERRED EMBODIMENTS

Figure 1:
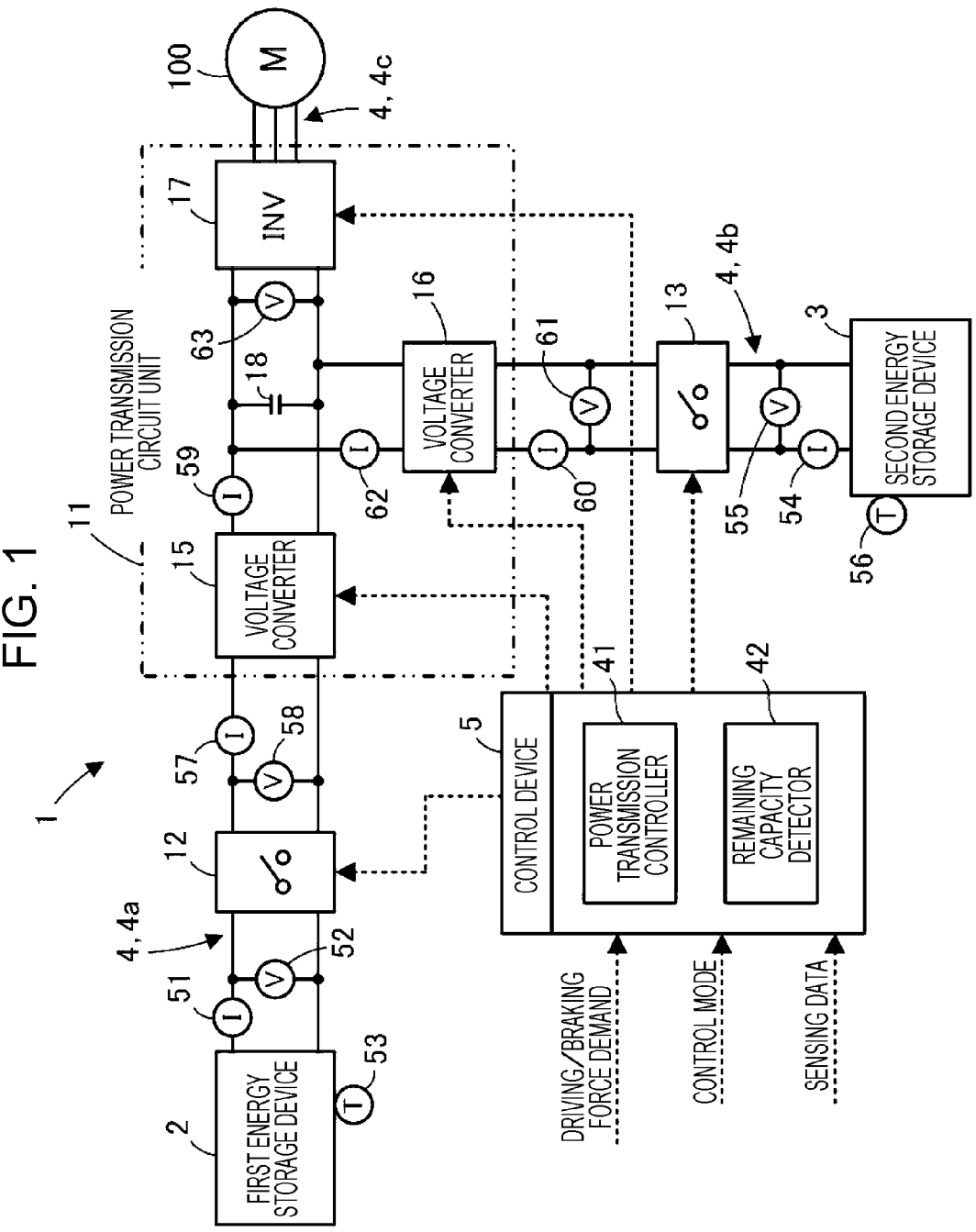
FIG. 1 illustrates an overall configuration of a power supply system according to embodiments of the present disclosure.

The embodiments will now be described with reference to the accompanying drawings, wherein like reference numerals designate corresponding or identical elements throughout the various drawings.

First Embodiment

A first embodiment of the present disclosure will be described hereinafter with reference to FIG. 1 to FIG. 19. Referring to FIG. 1, a power supply system 1 according to this embodiment is a system for supplying power to an electric motor 100, which is an example of an electric load.

In this embodiment, by way of example, the power supply system 1 is mounted in a transportation device, for example, an electrically driven vehicle (not illustrated), that includes the electric motor 100 as a propulsion generator. The electric motor 100 is capable of performing a power-running operation for generating a driving force upon being supplied with power, and also performing a regenerative operation for outputting regenerative power by using the kinetic energy of the electrically driven vehicle (hereinafter sometimes referred to simply as vehicle).

The power supply system 1 includes a first energy storage device 2, a second energy storage device 3, the electric motor 100, a power transmission path 4 provided between the first energy storage device 2 and the second energy storage device 3, and a control device 5 having a function of controlling activation of the power supply system 1. The first energy storage device 2 and the second energy storage device 3 serve as power sources. The power supply system 1 may also include additional electric loads such as auxiliaries, in addition to the electric motor 100.

The first energy storage device 2 and the second energy storage device 3 are energy storage devices having different characteristics. The first energy storage device 2 is an energy storage device having a higher energy density than the second energy storage device 3. The energy density is an amount of electrical energy storable per unit weight or unit volume. Examples of the first energy storage device 2 may include a lithium-ion battery, a fuel cell, and an air battery.

The second energy storage device 3 is an energy storage device having a higher power density than the first energy storage device 2. The power density is an amount of electricity that can be output per unit weight or unit volume (an amount of electrical energy per unit time or an amount of charge per unit time). Examples of the second energy storage device 3 may include a lithium-ion battery, a nickel-hydrogen battery, and a capacitor.

The first energy storage device 2 with a relatively high energy density is capable of storing a greater amount of electrical energy than the second energy storage device 3. In addition, the first energy storage device 2 has a characteristic in that steady discharging with potentially less variations in the output of the first energy storage device 2 prevents the progress of deterioration more than discharging with frequent variations in the output of the first energy storage device 2.

The second energy storage device 3 with a relatively higher power density has a lower internal resistance (impedance) than the first energy storage device 2, and is thus capable of outputting instantaneously high power. In addition, the second energy storage device 3 has a characteristic in that discharging or charging with the remaining capacity being kept at an approximately intermediate value prevents the progress of deterioration more than discharging or charging with the remaining capacity being biased toward the high-capacity side or the low-capacity side. More specifically, the second energy storage device 3 has a characteristic in that the progress of deterioration of the second energy storage device 3 is more likely to occur as the remaining capacity of the second energy storage device 3 increases to the high-capacity side or decreases to the low-capacity side from an intermediate value.

In this embodiment, the first energy storage device 2 and the second energy storage device 3 are each a rechargeable energy storage device.

The power transmission path 4 is constituted by a current-carrying line, a wiring pattern on a substrate, or the like. The power transmission path 4 has provided therein a power transmission circuit unit 11 for controlling power transmission among the first energy storage device 2, the second energy storage device 3, and the electric motor 100.

The power transmission path 4 includes a power transmission path 4a for use in power transmission between the first energy storage device 2 and the power transmission circuit unit 11, a power transmission path 4b for use in power transmission between the second energy storage device 3 and the power transmission circuit unit 11, and a power transmission path 4c for use in power transmission between the electric motor 100 and the power transmission circuit unit 11. The power transmission path 4a and 4b are respectively provided with contactors 12 and 13 as switch units for connection and disconnection of the power transmission path 4a and 4b.

The power transmission circuit unit 11 is configured to be capable of controlling power transmission among the first energy storage device 2, the second energy storage device 3, and the electric motor 100 in accordance with a control signal provided by the control device 5. More specifically, the power transmission circuit unit 11 is capable of selectively switching between the source and target of power and controlling an amount of power supplied (a supplied power) from the source of power to the target in accordance with a given control signal.

Specifically, the power transmission circuit unit 11 includes a voltage converter 15, a voltage converter 16, and an inverter 17. The voltage converter 15 is capable of boosting or stepping down a voltage input from the first energy storage device 2 and outputting the resulting voltage. The voltage converter 16 is capable of boosting or stepping down a voltage input from the second energy storage device 3 and outputting the resulting voltage. The inverter 17 is capable of converting direct-current (DC) power into alternating-current (AC) power and outputting the AC power.

The voltage converters 15 and 16 are connected in parallel on the input side of the inverter 17. The inverter 17 is further provided with a capacitor 18 on the input side thereof (the output side of the voltage converters 15 and 16). The capacitor 18 smooths the DC voltage to be input to the inverter 17 (the DC voltage output from the voltage converter 15 or 16).

The power transmission circuit unit 11 may be a circuit unit including the contactors 12 and 13.

Figure 2:
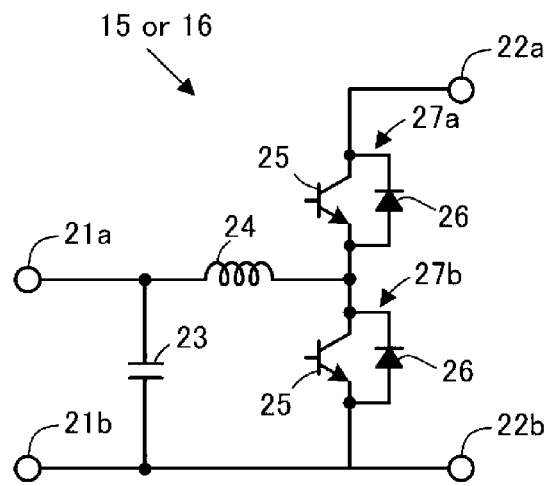
FIG. 2 illustrates an example circuit configuration of a voltage converter in the power supply system according to the embodiments.

The voltage converters 15 and 16 are so-called DC/DC converters, and may be each a known one. FIG. 2 illustrates an example circuit configuration of the voltage converters 15 and 16. The voltage converter 15 or 16 having the illustrated circuit configuration is a voltage converter capable of boosting the output voltage of the corresponding one of the first energy storage device 2 and the second energy storage device 3 and outputting the resulting voltage. The voltage converter 15 or 16 includes a pair of primary-side terminals 21a and 21b connected to the corresponding one of the first energy storage device 2 and the second energy storage device 3, a pair of secondary-side terminals 22a and 22b connected to the inverter 17, a capacitor 23, a coil 24, and high-side and low-side two switch units 27a and 27b. The capacitor 23, the coil 24, and the switch units 27a and 27b are connected between the pair of primary-side terminals 21a and 21b and the pair of secondary-side terminals 22a and 22b in an illustrated way. Each of the switch units 27a and 27b includes a semiconductor switch element 25, such as a transistor, and a diode 26, which are connected in parallel.

The voltage converter 15 or 16 having the configuration described above is capable of controlling the respective semiconductor switch elements 25 of the switch units 27a and 27b to be turned on or off in accordance with a control signal having a predetermined duty ratio (so-called duty signal) to output from the secondary-side terminals 22a and 22b a DC voltage obtained by boosting a DC voltage input to the primary-side terminals 21a and 21b at a required boosting ratio or to output a DC voltage, which is obtained by stepping down a DC voltage input to the secondary-side terminals 22a and 22b at a required step-down ratio, from the primary-side terminals 21a and 21b. The boosting ratio or the step-down ratio is variably controllable.

The voltage converter 15 or 16 is further capable of controlling the respective semiconductor switch elements 25 of the switch units 27a and 27b to be turned off to interrupt current flow (power transmission) from the secondary side to the primary side.

As a supplementary explanation, the voltage converters 15 and 16 may have a circuit configuration other than that illustrated in FIG. 2. Furthermore, any one or both of the voltage converters 15 and 16 may be configured to step down a voltage input from the first energy storage device 2 or the second energy storage device 3 and to output the resulting voltage. One of the voltage converters 15 and 16 may be omitted. The necessity of the voltage converter 15 or 16 or the voltage conversion type of the voltage converter 15 or 16 (namely, boosting or stepping down) may be selected from a variety of combinations in accordance with the voltage necessary to activate the electric load, the respective output voltages of the first energy storage device 2 and the second energy storage device 3, and so on.

For example, the first energy storage device 2 is a higher-voltage energy storage device than the second energy storage device 3. In this case, if one of the voltage converters 15 and 16 is to be omitted, it is more preferable that the voltage converter 15, which is connected to the first energy storage device 2, be omitted. Omission of one of the voltage converters 15 and 16 can reduce the cost required to realize a power supply system.

Figure 3:
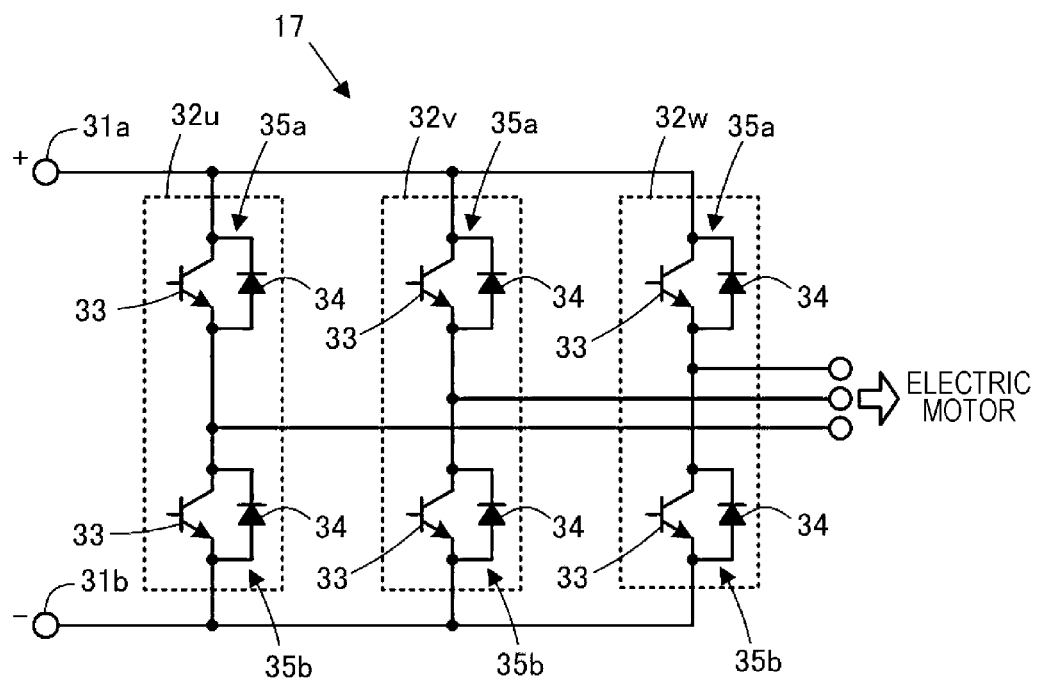
FIG. 3 illustrates an example circuit configuration of an inverter in the power supply system according to the embodiments.

The inverter 17 may be an inverter having a known circuit configuration. FIG. 3 illustrates an example circuit configuration of the inverter 17 when the electric motor 100 is a three-phase electric motor, for example. The inverter 17 illustrated in FIG. 3 is configured such that three-phase arms 32u, 32v, and 32w of the U, V, and W phases are connected in parallel between a pair of power supply terminals 31a and 31b to which a DC voltage is applied. Each of the arms 32u, 32v, and 32w of the respective phases includes high-side and low-side two switch units 35a and 35b that are connected in series. Each of the switch units 35a and 35b includes a diode 34 and a semiconductor switch element 33 such as a transistor that are connected in parallel. The midpoints of the switch units 35a and 35b of the arms 32u, 32v, and 32w of the respective phases serve as three-phase AC power output units.

The inverter 17 having the configuration described above is capable of controlling the respective semiconductor switch elements 33 of the switch units 35a and 35b of the arms 32u, 32v, and 32w of the respective phases to be turned on or off in accordance with a control signal generated by using the pulse width modulation (PWM) control method or the like to convert a DC power input to the power supply terminals 31a and 31b into three-phase AC power, and outputting the AC power to the electric motor 100 (the electric motor 100 which is in power-running operation).

During the regenerative operation of the electric motor 100 (during generation of power), the inverter 17 is capable of controlling the respective semiconductor switch elements 33 of the switch units 35a and 35b of the arms 32u, 32v, and 32w of the respective phases to be turned on or off in accordance with a control signal having a predetermined duty ratio (so-called duty signal) to convert a three-phase AC power input from the electric motor 100 into DC power, and outputting the DC power from the power supply terminals 31a and 31b.

As a supplementary explanation, the number of phases (the number of arms) of the inverter 17 is set in accordance with the number of phases of the AC power necessary to activate the electric load. Furthermore, if the electric load is an electric load (e.g., a DC motor) activated by causing DC power to flow therethrough, the inverter 17 may be omitted.

The power transmission circuit unit 11 having the configuration described above is configured to control the voltage converters 15 and 16 and the inverter 17 (specifically, provide each of the voltage converters 15 and 16 and the inverter 17 with a control signal (duty signal having a predetermined duty ratio) for turning on or off the semiconductor switch elements 25 or 33) to control power transmission among the first energy storage device 2, the second energy storage device 3, and the electric motor 100.

For example, the following operation may be performed during the power-running operation of the electric motor 100: supplying power from one or both of the first energy storage device 2 and the second energy storage device 3 to the electric motor 100, supplying power from the first energy storage device 2 to the second energy storage device 3 to charge the second energy storage device 3, or supplying regenerative power which is obtained during the regenerative operation of the electric motor 100 to charge one or both of the first energy storage device 2 and the second energy storage device 3.

In this embodiment, the first energy storage device 2 is not charged with power supplied by the second energy storage device 3. However, the power transmission circuit unit 11 may be controlled so that the first energy storage device 2 is charged with power supplied by the second energy storage device 3.

The control device 5 is constituted by an electronic circuit unit including a central processing unit (CPU), a random access memory (RAM), a read-only memory (ROM), an interface circuit, and so on. The control device 5 may be constituted by a plurality of electronic circuit units that are capable of communicating with each other.

The control device 5 includes a power transmission controller 41 and a remaining capacity detector 42 as functions implemented by a hardware configuration to be mounted therein or a program (software configuration) installed therein. The power transmission controller 41 controls the power transmission circuit unit 11 to control power transmission among the first energy storage device 2, the second energy storage device 3, and the electric motor 100. The remaining capacity detector 42 detects the respective remaining capacities (called states of charge (SOCs)) of the first energy storage device 2 and the second energy storage device 3.

The control device 5 receives, as information necessary to implement the functions described above, a driving/braking force demand, a control mode, and various kinds of sensing data. The driving/braking force demand is constituted by a driving force demand that is a request value for a driving force (driving torque) to be generated by the electric motor 100 during the power-running operation or a braking force demand that is a request value for a. braking force (regenerative torque) to be generated by the electric motor 100 during the regenerative operation. The control mode specifies how the power transmission circuit unit 11 is controlled.

The driving/braking force demand is set by a vehicle control device (not illustrated) while an electrically driven vehicle in which the power supply system 1 according to this embodiment is mounted is traveling, in accordance with values such as the respective detected values of the amount of operation of the accelerator pedal and the amount of operation of the brake pedal.

The control device 5 may have a function of setting a driving/braking force demand.

The control mode is set by, for example, the driver of the electrically driven vehicle by operating a mode switching operation device (not illustrated). In this embodiment, three control modes, namely, first to third control modes described below, are selectively set for the control device 5. The control mode may be automatically set in accordance with the state of travel of the electrically driven vehicle, the environment in which the electrically driven vehicle is traveling, or the like.

As to the sensing data, for example, the following data is input to the control device 5: the detection data of a current sensor 51, a voltage sensor 52, a temperature sensor 53, a current sensor 54, a voltage sensor 55, a temperature sensor 56, a current sensor 57, a voltage sensor 58, a current sensor 59, a current sensor 60, a voltage sensor 61, a current sensor 62, and a voltage sensor 63. The current sensor 51 detects a current flowing through the first energy storage device 2. The voltage sensor 52 detects an output voltage of the first energy storage device 2. The temperature sensor 53 detects a temperature of the first energy storage device 2. The current sensor 54 detects a current flowing through the second energy storage device 3. The voltage sensor 55 detects an output voltage of the second energy storage device 3. The temperature sensor 56 detects a temperature of the second energy storage device 3. The current sensor 57 and the voltage sensor 58 detect a current and voltage on the input side of the voltage converter 15 (the first energy storage device 2 side), respectively. The current sensor 59 detects a current on the output side of the voltage converter 15 (the inverter 17 side). The current sensor 60 and the voltage sensor 61 detect a current and voltage on the input side of the voltage converter 16 (the second energy storage device 3 side), respectively. The current sensor 62 detects a current on the output side of the voltage converter 16 (the inverter 17 side). The voltage sensor 63 detects a voltage on the input side of the inverter 17 (the voltages on the respective output sides of the voltage converters 15 and 16). The above-described pieces of detection data are input to the control device 5.

The remaining capacity detector 42 of the control device 5 sequentially detects (estimates) the remaining capacity of the first energy storage device 2 by using the detection data of the sensors for the first energy storage device 2, namely, the current sensor 51, the voltage sensor 52, and the temperature sensor 53, for example. Further, the remaining capacity detector 42 sequentially detects (estimates) the remaining capacity of the second energy storage device 3 by using the detection data of the sensors for the second energy storage device 3, namely, the current sensor 54, the voltage sensor 55, and the temperature sensor 56, for example.

There have hitherto been proposed a variety of techniques for detecting the remaining capacity of an energy storage device. A known technique may be employed as a technique for detecting the remaining capacities of the first energy storage device 2 and the second energy storage device 3.

The technique for detecting the respective remaining capacities of the first energy storage device 2 and the second energy storage device 3 may be a technique that does not use the detection data of any one of the current flow, the output voltage, and the temperature, or a technique that uses any other detection data. A detection device different from the control device 5 may perform a process of detecting the respective remaining capacities of the first energy storage device 2 and the second energy storage device 3.

The power transmission circuit unit 11 controls the voltage converters 15 and 16 and the inverter 17 of the power transmission circuit unit 11 by, for example, appropriately using the detection data of the current sensors 57, 59, 60, and 62 and the voltage sensors 58, 61, and 63, the driving/braking force demand of the electric motor 100, and the detected values of the respective remaining capacities of the first energy storage device 2 and the second energy storage device 3, which are obtained by the remaining capacity detector 42.

Control Process for Power Transmission Controller

A control process for the power transmission controller 41 of the control device 5 will now be described in detail hereinafter.

Figure 4:
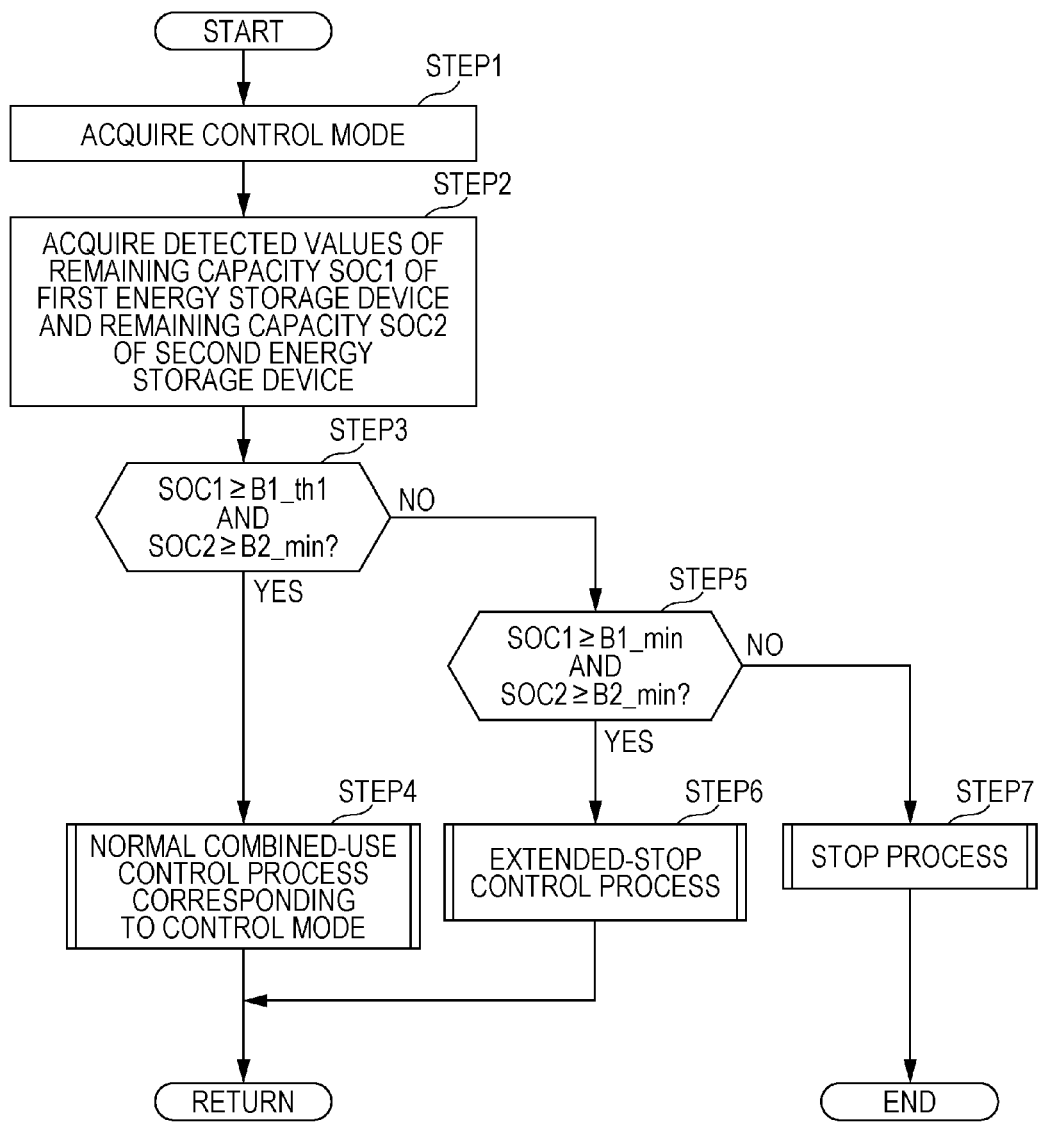
FIG. 4 is a flowchart of a control process for a control device in the power supply system according to the embodiments.

During the travel of the vehicle, the control device 5 sequentially executes a control process illustrated in a flowchart in FIG. 4 by using the power transmission controller 41 at intervals of a predetermined control process period. The control process illustrated in the flowchart in FIG. 4 is a control process performed during the power-running operation of the electric motor 100.

In STEP1, the power transmission controller 41 acquires the currently set control mode. Then, in STEP2, the power transmission controller 41 acquires, from the remaining capacity detector 42, a detected value of the remaining capacity SOC1 of the first energy storage device 2 (hereinafter sometimes referred to as first remaining capacity SOC1) and a detected value of the remaining capacity SOC2 of the second energy storage device 3 (hereinafter sometimes referred to as second remaining capacity SOC2).

Then, in STEP3, the power transmission controller 41 determines whether or not the following conditions hold true: the detected value of the first remaining capacity SOC1 is greater than or equal to a predetermined threshold value B1_th1 and the detected value of the second remaining capacity SOC2 is greater than or equal to a predetermined lower limit value B2_min.

The threshold value B1_th1 for the first remaining capacity SOC1 is a threshold value determined in advance as a limit value of the first remaining capacity SOC1 which is required for a normal combined-use control process described below. The threshold value B1_th1 may be, for example, a limit remaining capacity value that allows only the first energy storage device 2 to supply a supplied power required for the electric motor 100 to generate a certain output (e.g., a supplied power required for the vehicle to cruise at a predetermined vehicle speed) to the electric motor 100. The threshold value B1_th1 is set to a value slightly higher than a lower limit value B1_min (a near-zero value). The lower limit value B1_min is a limit remaining capacity value that allows the first energy storage device 2 to supply power to outside so as to prevent the first energy storage device 2 from deteriorating.

The lower limit value B2_min for the second remaining capacity SOC2 is a limit remaining capacity value (a near-zero value) that allows the second energy storage device 3 to supply power to outside so as to prevent the second energy storage device 3 from deteriorating.

The determination result of STEP3 is affirmative when the first remaining capacity SOC1 and the second remaining capacity SOC2 take values that fall in a normal range (common range). In this situation, in STEP4, the power transmission controller 41 executes a normal combined-use control process corresponding to the currently set control mode. The normal combined-use control process is a process for controlling the power transmission circuit unit 11 to supply power from one or both of the first energy storage device 2 and the second energy storage device 3 to the electric motor 100 in the manner corresponding to the control mode and to, when power is supplied from the first energy storage device 2 to the electric motor 100, supply power from the first energy storage device 2 to charge the second energy storage device 3, if necessary. The details of the normal combined-use control process will be described below.

The normal combined-use control process allows the second energy storage device 3 to be charged with power supplied from the first energy storage device 2, if necessary, whereas the remaining capacity SOC1 of the first energy storage device 2 decreases. Thus, the first remaining capacity SOC1 becomes smaller than the threshold value B1_th1 and the determination result of STEP3 becomes negative.

When the determination result of STEP3 is negative, then, in STEP5, the power transmission controller 41 determines whether or not the following conditions hold true: the detected value of the first remaining capacity SOC1 is greater than or equal to the lower limit value B1_min and the detected value of the second remaining capacity SOC2 is greater than or equal to the lower limit value B2_min.

The determination result of STEP5 is affirmative when, in particular, the remaining capacity of the first energy storage device 2 is low but it is possible to supply power to the electric motor 100 for a certain time period by the cooperation of the first energy storage device 2 and the second energy storage device 3 so as to allow the electric motor 100 to generate a demanded driving force.

In this situation, in STEP6, the power transmission controller 41 executes an extended-stop control process. The extended-stop control process is a process for controlling the power transmission circuit unit 11 so that the remaining capacity of both the first energy storage device 2 and the second energy storage device 3 is consumed as much as possible. The details of the extended-stop control process will be described below.

The determination result of STEP5 is negative when it is difficult to supply power from the first energy storage device 2 and the second energy storage device 3 to the electric motor 100. In this situation, the power transmission controller 41 executes a stop process. In the stop process, the power transmission controller 41 controls the voltage converters 15 and 16 or the contactors 12 and 13 to interrupt the output of the first energy storage device 2 and the second energy storage device 3 (discharging to the load side) and to hold the interruption state.

In the stop process, the control device 5 generates an alarm output (visual output or audio output) to alert the vehicle driver that, for example, the vehicle is no longer able to travel or the electric motor 100 is no longer able to operate due to the insufficient remaining capacity of the first energy storage device 2 and the second energy storage device 3.

Normal Combined-Use Control Process

The normal combined-use control process in STEP4 described above will now be described in detail. Brief definitions of terms as used in the following description are presented below.

In the following description, the "output" or "input" of each of the first energy storage device 2 and the second energy storage device 3, the "supplied power" or the "charging power" refers to an amount of electricity expressed as a value of (electric) power (an amount of electrical energy per unit time), for example.

The "supplied power corresponding to a driving force demand DT_dmd" of the electric motor 100 refers to an amount of power to be supplied which allows a driving force generated by the electric motor 100 when this power is supplied to the electric motor 100 to be identical to or substantially identical to the driving force demand DT_dmd.

The "supplied power corresponding to the driving force demand DT_dmd" is based on the driving force demand DT_dmd and the rotational speed of the electric motor 100 (specifically, the rotational speed of a rotor or an output shaft of the electric motor 100) when the "supplied power" refers to an amount of electricity expressed as a value of (electric) power. In this case, the value of the "supplied power corresponding to the driving force demand DT_dmd" can be determined by using, for example, the driving force demand DT_dmd and the detected value of the rotational speed of the electric motor 100 in accordance with a map or an operational expression.

The "supplied power corresponding to a certain threshold value" related to the driving force demand DT_dmd refers to an amount of power to be supplied which corresponds to the driving force demand DT_dmd when the driving force demand DT_dmd is made to coincide with the threshold value.

First Control Mode

Based on the terms defined above, a case in which the control mode is set to the first control mode, which is a basic control mode among the first to third control modes, will be described with reference to FIG. 5 to FIG. 10.

The first control mode is a control mode for controlling the power transmission circuit unit 11 so as to prevent as much as possible the progress of deterioration of the first energy storage device 2 and the second energy storage device 3.

Figure 5:
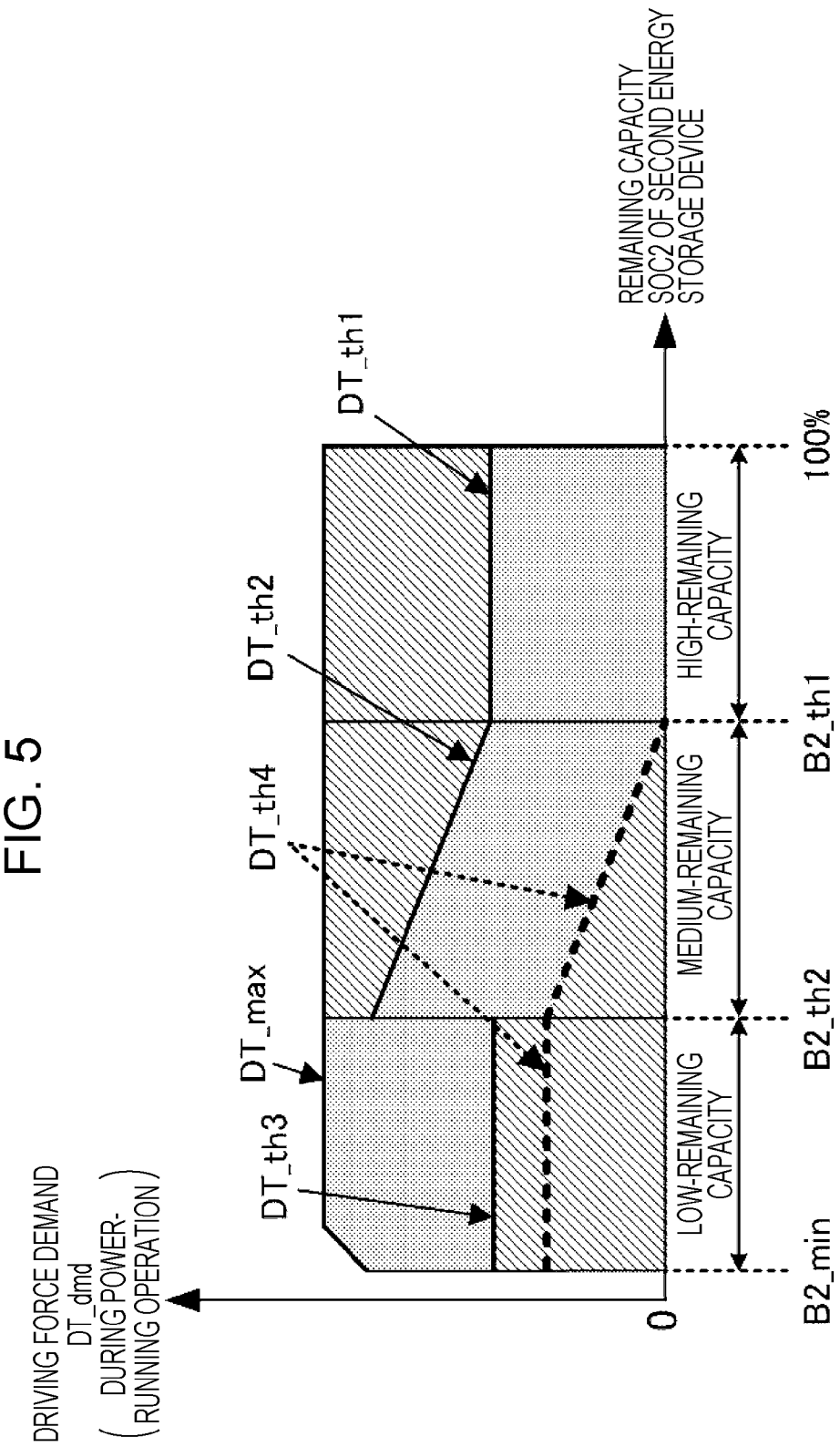
FIG. 5 illustrates, in map form, the relationship between a driving force demand and the remaining capacity of a second energy storage device in a normal combined-use control process in a first control mode, which is executed in executed in STEP4 in FIG. 4.

An overview of the normal combined-use control process in the first control mode will be described with reference to FIG. 5. FIG. 5 illustrates, in map form, the relationship in the first control mode between the second remaining capacity SOC2 and the proportion of powers to be output by the first energy storage device 2 and the second energy storage device 3 with respect to the amount of electricity to be supplied (the supplied power) to the electric motor 100 in accordance with the driving force demand DT_dmd of the electric motor 100.

In FIG. 5, diagonally hatched areas represent areas in which the first energy storage device 2 is responsible for supplying part or all of the supplied power to the electric motor 100, and shaded areas represent areas in which the second energy storage device 3 is responsible for supplying part or all of the supplied power to the electric motor 100.

More specifically, a diagonally hatched area adjoining the line (horizontal axis) along which the driving force demand DT_dmd=0 holds represents an area within which only the first energy storage device 2 is responsible for supplying all of the supplied power to the electric motor 100, and a shaded area adjoining the line (horizontal axis) represents an area within which only the second energy storage device 3 is responsible for supplying all of the supplied power to the electric motor 100.

A shaded area above the diagonally hatched areas or a diagonally hatched area above the shaded areas represents an area within which both the first energy storage device 2 and the second energy storage device 3 are responsible for supplying the supplied power to the electric motor 100.

In the normal combined-use control process in the first control mode, as illustrated in FIG. 5, the proportion of powers to be output by the first energy storage device 2 and the second energy storage device 3 in accordance with the driving force demand DT_dmd of the electric motor 100 is different depending on when the value of the second remaining capacity SOC2 falls within a high-remaining-capacity area that satisfies SOC2≥B2_th1 (including the remaining capacity value reaching full state-of-charge (100%)), when the value of the second remaining capacity SOC2 falls within a medium-remaining-capacity area that satisfies B2_th1>SOC2≥B2_th2, or when the value of the second remaining capacity SOC2 falls within a low-remaining-capacity area that satisfies B2_th2>SOC2. The supplied power corresponding to the driving force demand DT_dmd of the electric motor 100 is fed from one or both of the first energy storage device 2 and the second energy storage device 3 to the electric motor 100 in the proportion for the high-, medium-, or low-remaining-capacity area.

In this embodiment, more specifically, the low-remaining-capacity area is a remaining capacity area that satisfies B2_th2>SOC2≥B2_min since the normal combined-use control process is a process performed when the detected value of the second remaining capacity SOC2 is greater than or equal to the lower limit value B2_min.

In FIG. 5, the threshold values B2_th1 and B2_th2, which are used to separate the second remaining capacity SOC2, are threshold values (fixed values) determined in advance as those for the first control mode. The threshold values B2_th1 and B2_th2 are set in advance based on an experiment or the like so that the medium-remaining-capacity area whose boundaries are defined by the threshold values B2_th1 and B2_th2 is a remaining capacity area within which the actual value of the second remaining capacity SOC2 preferably falls to prevent as much as possible the progress of deterioration of the second energy storage device 3. Accordingly, the medium-remaining-capacity area whose boundaries are defined by the threshold values B2_th1 and B2_th2 is a remaining capacity area that can prevent the progress of deterioration of the second energy storage device 3, as desired, when the second energy storage device 3 is charged or discharged in such a manner that the actual value of the second remaining capacity SOC2 is kept within the medium-remaining-capacity area as much as possible.

The normal combined-use control process in the first control mode will now be described in a more specific manner.

Figure 6:
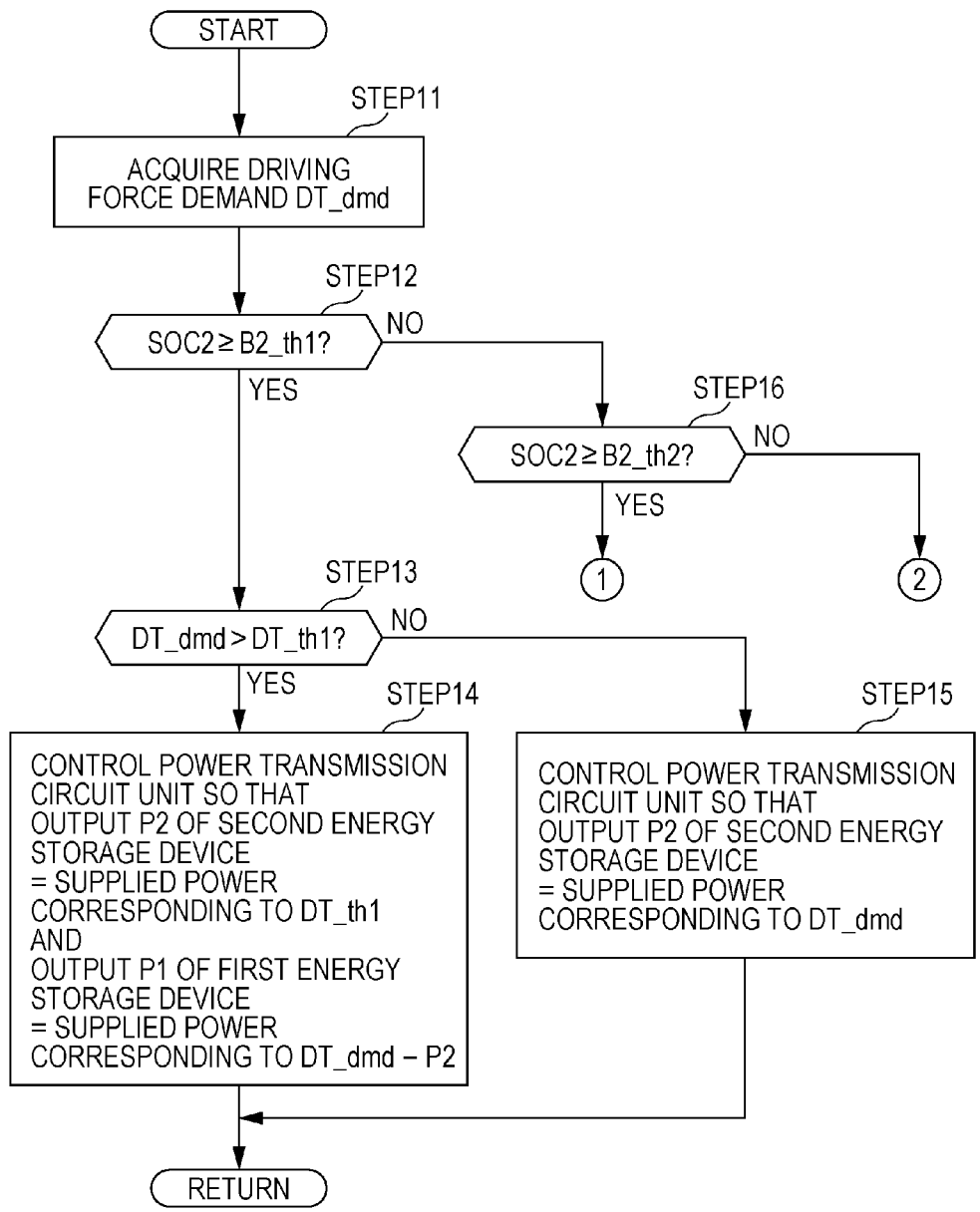
FIG. 6 is a flowchart illustrating the normal combined-use control process executed in STEP4 in FIG. 4.
Figure 7:
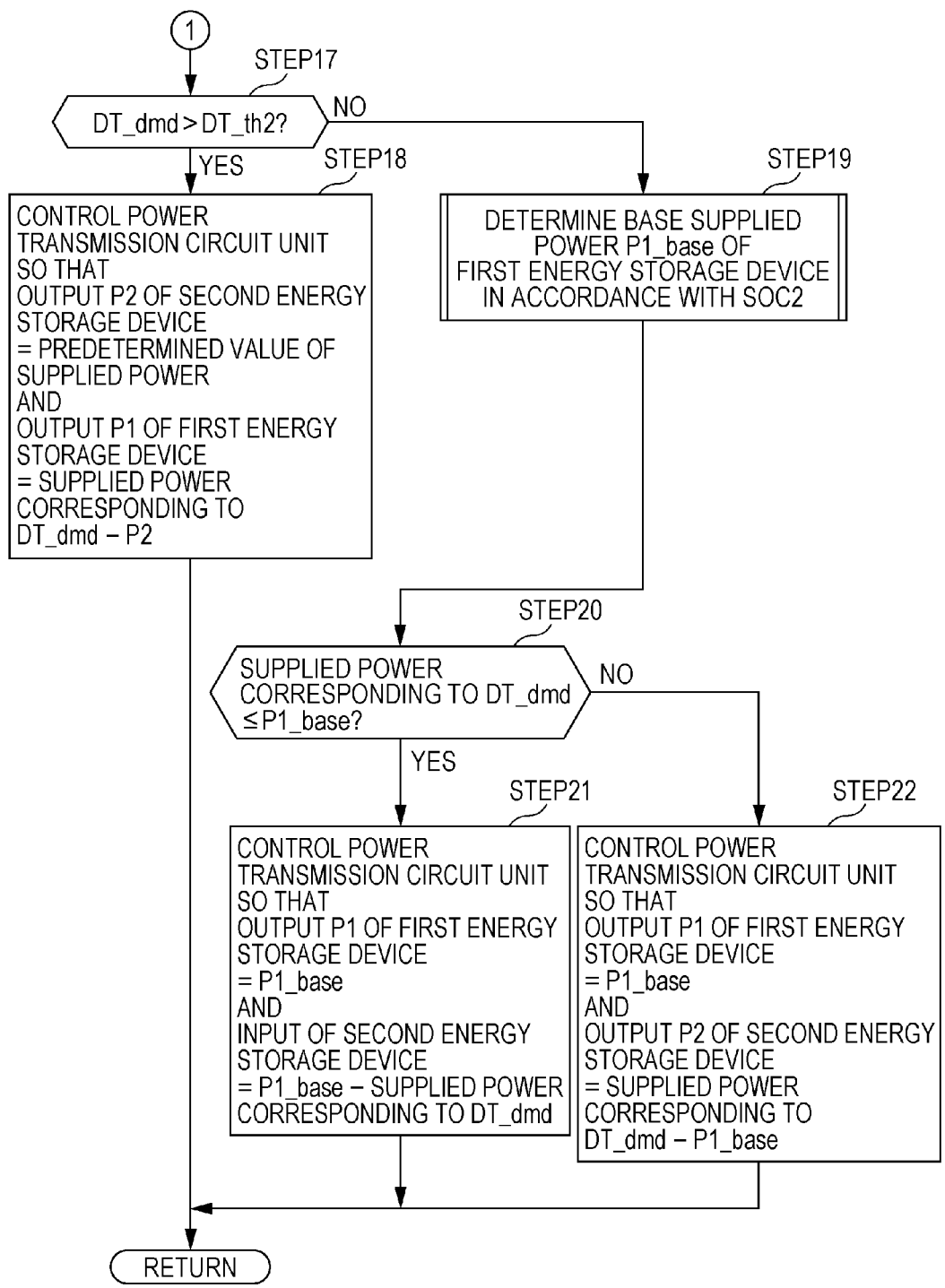
FIG. 7 is a flowchart illustrating the normal combined-use control process executed in STEP4 in FIG. 4.
Figure 8:
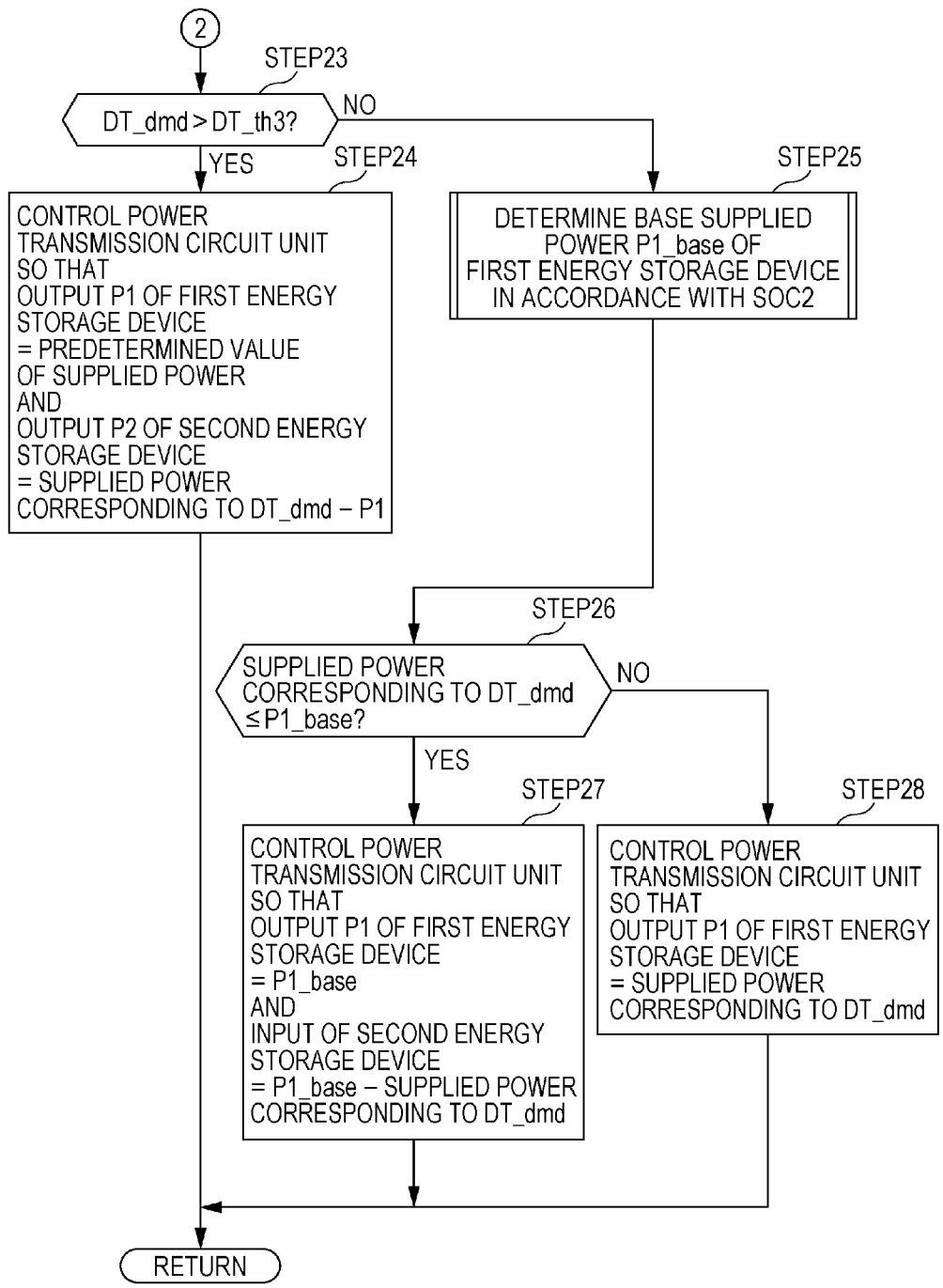
FIG. 8 is a flowchart illustrating the normal combined-use control process executed in STEP4 in FIG. 4.

In the normal combined-use control process, the power transmission controller 41 sequentially executes a process illustrated in a flowchart in FIG. 6 to FIG. 8 at intervals of a predetermined control process period.

In STEP11, the power transmission controller 41 acquires the driving force demand DT_dmd of the electric motor 100. Then, in STEP12, the power transmission controller 41 determines whether or not the detected value of the second remaining capacity SOC2, which is acquired in STEP2, is greater than or equal to the threshold value B2_th1, which is the lower limit of the high-remaining-capacity area.

The determination result of STEP12 is affirmative when the detected value of the second remaining capacity SOC2 falls within the high-remaining-capacity area. In this case, then, in STEP13, the power transmission controller 41 determines whether or not the driving force demand DT_dmd is larger than a predetermined threshold value DT_th1.

In an example of this embodiment, the threshold value DT_th1 is a predetermined constant value (fixed value) that has been determined in advance. The threshold value DT_th1 may be, for example, an upper limit driving force value, or a nearby driving force value, that can be generated by the electric motor 100 using power supplied only from the second energy storage device 3 when the second remaining capacity SOC2 falls within the high-remaining-capacity area. The threshold value DT_th1 may be set to be variable by using, for example, the detected value of the temperature of the second energy storage device 3, which is obtained by the temperature sensor 56, in order to more appropriately prevent deterioration of the second energy storage device 3.

The determination result of STEP13 is affirmative within the diagonally hatched area in the high-remaining-capacity area illustrated in FIG. 5. In this case, in STEP14, the power transmission controller 41 controls the power transmission circuit unit 11 so that an output P2 of the second energy storage device 3 coincides with a supplied power corresponding to the threshold value DT_th1 and so that an output P1 of the first energy storage device 2 coincides with the power deficit obtained by subtracting the output P2, which is a portion that the second energy storage device 3 is responsible for supplying, from the supplied power corresponding to the driving force demand DT_dmd.

The output P1 of the first energy storage device 2 is, specifically, an amount of electricity output from (an amount of power discharged from) the first energy storage device 2, and the output P2 of the second energy storage device 3 is, specifically, an amount of electricity output from (an amount of power discharged from) the first energy storage device 2.

Accordingly, the supplied power corresponding to the driving force demand DT_dmd is fed from both the first energy storage device 2 and the second energy storage device 3 to the electric motor 100 in such a manner that the sum of the output P1 of the first energy storage device 2 and the output P2 of the second energy storage device 3 coincides with the supplied power corresponding to the driving force demand DT_dmd. In this case, a portion (the output P2), which the second energy storage device 3 is responsible for supplying, of the supplied power corresponding to the driving force demand DT_dmd is equal to the supplied power corresponding to the threshold value DT_th1.

The processing of STEP14 can be, specifically, executed in the following way, for example. A target value for the input voltage of the inverter 17 (=the output voltages of the voltage converters 15 and 16) is set in accordance with the detected value of the rotational speed of the electric motor 100 or the like. In addition, the supplied power corresponding to the threshold value DT_th1 is set as the target value for the output power of the voltage converter 16, and a supplied power obtained by subtracting the output P2 (=the supplied power corresponding to the threshold value DT_th1), which is a portion that the second energy storage device 3 is responsible for supplying, from the supplied power corresponding to the driving force demand DT_dmd is set as the target value for the output power of the voltage converter 15.

Further, the voltage converters 15 and 16 are controlled by using a control signal (duty signal) so as to realize the target value for the input voltage of the inverter 17 and the target values for the respective output powers of the voltage converters 15 and 16. Also, the inverter 17 is feedback-controlled by using a control signal (duty signal) so as to cause a target current to flow through the electric motor 100. The target current is a current that can realize a target power set in accordance with the driving force demand DT_dmd or a target power obtained by limiting the target power through a limiting process (a limiting process for limiting the respective outputs of the energy storage devices 2 and 3).

On the other hand, the determination result of STEP13 is negative within the shaded area in the high-remaining-capacity area illustrated in FIG. 5. In this case, in STEP15, the power transmission controller 41 controls the power transmission circuit unit 11 so that the output P2 of the second energy storage device 3 coincides with the supplied power corresponding to the driving force demand DT_dmd.

Accordingly, the supplied power corresponding to the driving force demand DT_dmd is fed to the electric motor 100 only from the second energy storage device 3 without using the first energy storage device 2.

The processing of STEP15 can be, specifically, executed in the following way, for example. A target value for the input voltage of the inverter 17 (=the output voltage of the voltage converter 16) is set in accordance with the detected value of the rotational speed of the electric motor 100 or the like. In addition, the supplied power corresponding to the driving force demand DT_dmd is set as the target value for the output power of the voltage converter 16.

Further, the voltage converter 16 is controlled so as to realize the target value for the input voltage of the inverter 17 and the target value for the output power of the voltage converter 16. Also, the inverter 17 is feedback-controlled so as to cause the target current corresponding to the driving force demand DT_dmd to flow through the electric motor 100.

Further, the voltage converter 15 is controlled to be in power supply interruption state. Alternatively, the contactor 12 on the first energy storage device 2 side is controlled to be turned off.

As described above, when the detected value of the second remaining capacity SOC2 falls within the high-remaining-capacity area, power is supplied to the electric motor 100 from an energy storage device including at least the second energy storage device 3 out of the first energy storage device 2 and the second energy storage device 3 during the power-running operation of the electric motor 100. This allows the second energy storage device 3 to be actively discharged to make the remaining capacity SOC2 of the second energy storage device 3 approach the medium-remaining-capacity area. Thus, the second energy storage device 3 can be prevented from deteriorating while the driving force demand DT_dmd of the electric motor 100 is met.

As a supplementary explanation, the threshold value DT_th1, which is used in the determination processing of STEP13, may be set in a way different from that described above. For example, the threshold value DT_th1 may be set so that the supplied power corresponding to the threshold value DT_th1 is equal to a predetermined constant value (e.g., an upper-limit supplied power that can be output by the second energy storage device 3 within the high-remaining-capacity area or a nearby constant value of supplied power). The threshold value DT_th1 may also be set to vary depending on the detected value of the second remaining capacity SOC2.

When the determination result of STEP12 is negative, in STEP16, the power transmission controller 41 further determines whether or not the detected value of the second remaining capacity SOC2 is greater than or equal to the threshold value B2_th2, which is the lower limit of the medium-remaining-capacity area.

The determination result of STEP16 is affirmative when the detected value of the second remaining capacity SOC2 falls within the medium-remaining-capacity area. In this situation, then, in STEP17 (see FIG. 7), the power transmission controller 41 determines whether or not the driving force demand DT_dmd is larger than a predetermined threshold value DT_th2.

In an example of this embodiment, for example, as illustrated in FIG. 5, the predetermined threshold value DT_th2 is a threshold value set to be variable in accordance with the detected value of the second remaining capacity SOC2. Specifically, the threshold value DT_th2 is set to increase as the detected value of the second remaining capacity SOC2 decreases. In addition, the threshold value DT_th2 is set to a driving force value larger than the driving force that can be generated by the electric motor 100 when a base supplied power P1_base described below is fed to the electric motor 100.

The determination result of STEP17 is affirmative within the diagonally hatched area above the shaded area in the medium-remaining-capacity area illustrated in FIG. 5. In this case, in STEP18, the power transmission controller 41 controls the power transmission circuit unit 11 so that the output P2 of the second energy storage device 3 coincides with a predetermined value of supplied power and so that the output P1 of the first energy storage device 2 coincides with the power deficit obtained by subtracting the output P2, which is a portion that the second energy storage device 3 is responsible for supplying, from the supplied power corresponding to the driving force demand DT_dmd.

In this case, specific control of the power transmission circuit unit 11 can be performed in a manner similar to that in STEP14 in FIG. 6.

Accordingly, the supplied power corresponding to the driving force demand DT_dmd is fed from both the first energy storage device 2 and the second energy storage device 3 to the electric motor 100 in such a manner that the sum of the output P1 of the first energy storage device 2 and the output P2 of the second energy storage device 3 coincides with the supplied power corresponding to the driving force demand DT_dmd. In this case, a portion of the supplied power corresponding to the driving force demand DT_dmd which the second energy storage device 3 is responsible for supplying is equal to a predetermined value of supplied power.

In this case, the predetermined value of supplied power, which is output from the second energy storage device 3, may be, for example, an upper-limit supplied power that can be output by the second energy storage device 3 within the medium-remaining-capacity area or a nearby constant value of supplied power. Alternatively, the predetermined value of supplied power may be, for example, a supplied power set to vary depending on the detected value of the second remaining capacity SOC2.

On the other hand, when the determination result of STEP17 is negative, then, in STEP19, the power transmission controller 41 determines the base supplied power P1_base, which is a "base" value of the output P1 of the first energy storage device 2, in accordance with the detected value of the second remaining capacity SOC2.

The base supplied power P1_base is a lower limit amount of electricity to be output from the first energy storage device 2 regardless of the driving force demand DT_dmd when the detected value of the second remaining capacity SOC2 falls within the medium-remaining-capacity area or the low-remaining-capacity area. That is, in this embodiment, the power transmission circuit unit 11 is controlled so that the base supplied power P1_base or a larger supplied power is output from the first energy storage device 2 regardless of the driving force demand DT_dmd when the detected value of the second remaining capacity SOC2 falls within the medium-remaining-capacity area or the low-remaining-capacity area.

Figure 9:
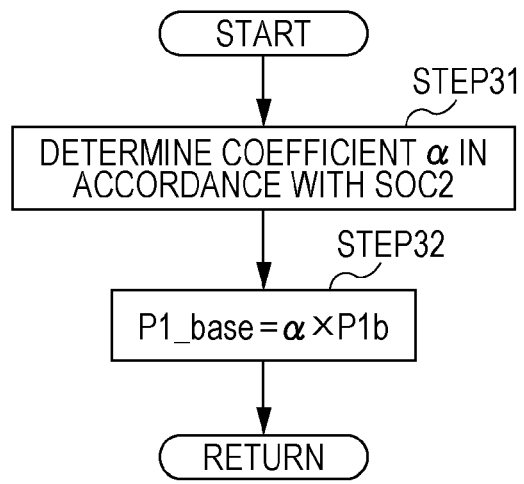
FIG. 9 is a flowchart illustrating the processing of STEP19 in FIG. 7 or the processing of STEP25 in FIG. 8.

The base supplied power P1_base is set in a way illustrated in a flowchart in FIG. 9, for example. Specifically, in STEP31, the power transmission controller 41 determines a coefficient $\alpha$ in accordance with the detected value of the second remaining capacity SOC2. The coefficient a specifies a pattern in which the base supplied power P1_base changes in accordance with the detected value of the second remaining capacity SOC2.

Figure 10:
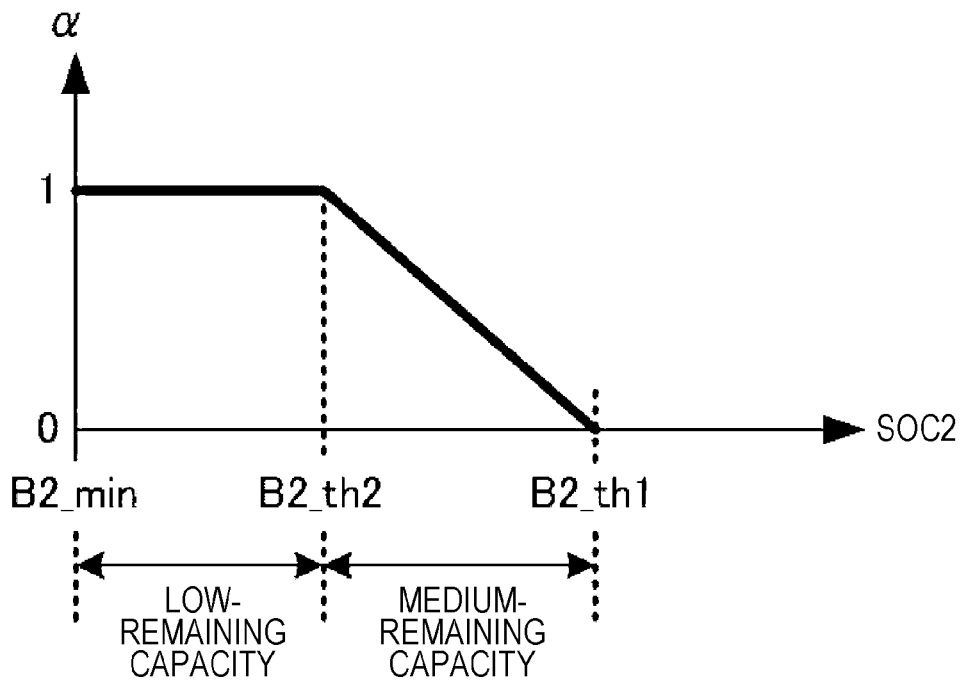
FIG. 10 is a graph illustrating the relationship between a coefficient a, which is used in the process illustrated in FIG. 9, and the remaining capacity of the second energy storage device.

The coefficient $\alpha$ is set from the detected value of the second remaining capacity SOC2 in accordance with, for example, a pattern depicted on a graph in FIG. 10 by using a map created in advance or by using an operational expression. In the illustrated example, the coefficient $\alpha$ takes a value in the range from "0" to "1". The value of the coefficient $\alpha$ is basically set to increase as the detected value of the second remaining capacity SOC2 decreases within a remaining capacity area (low-side remaining capacity area) obtained by combining the medium-remaining-capacity area and the low-remaining-capacity area of the second energy storage device 3.

More specifically, when the detected value of the second remaining capacity SOC2 falls within the medium-remaining-capacity area, the value of the coefficient $\alpha$ is set to successively increase from "0" to "1" as the detected value of the second remaining capacity SOC2 decreases from the threshold value B2_th1, which is the upper limit of the medium-remaining-capacity area, to the threshold value B2_th2, which is the lower limit of the medium-remaining-capacity area.

When the detected value of the second remaining capacity SOC2 falls within the low-remaining-capacity area, the value of the coefficient $\alpha$ is set to the maximum value "1".

Then, in STEP32, the power transmission controller 41 multiplies a supplied power P1$b$ having a predetermined (fixed) value by the value of the coefficient $\alpha$ determined in the way described above to calculate the base supplied power P1_base ($=\alpha \times$P1$b$). The supplied power P1$b$ is a maximum value of the base supplied power P1_base.

Accordingly, the base supplied power P1_base is determined to change in the same or substantially the same pattern as that of the coefficient $\alpha$ in accordance with the detected value of the second remaining capacity SOC2.

The base supplied power P1_base may be defined by, for example, setting an upper limit of the output P1 of the first energy storage device 2 in accordance with the detected value of the first remaining capacity SOC1 or the like and, when the base supplied power P1_base calculated in the way described above exceeds the upper limit, executing a limiting process after the processing of STEP32 to forcibly limit the base supplied power P1_base to the upper limit.

Alternatively, for example, the base supplied power P1_base may be determined, instead of by performing the processing of STEP31 and STEP 32, directly from the detected value of the second remaining capacity SOC2 by using a map created in advance or by using an operational expression.

Referring back to FIG. 7, after the processing of STEP19 has been executed in the way described above, then, in STEP20, the power transmission controller 41 determines whether or not the supplied power corresponding to the driving force demand DT_dmd is less than or equal to the base supplied power P1_base. The determination processing in STEP20 is equivalent to a process of determining whether or not the driving force demand DT_dmd is less than or equal to a threshold value obtained by converting the base supplied power P1_base into a driving force value in accordance with the detected value of the rotational speed of the electric motor 100. This threshold value is a threshold value DT_th4 indicated by a broken line in FIG. 5. The threshold value DT_th4 indicated by the broken line in FIG. 5 is a threshold value obtained when the rotational speed of the electric motor 100 is set to be constant.

The determination result of STEP20 is affirmative within the bottom diagonally hatched area in the medium-remaining-capacity area illustrated in FIG. 5. In this situation, in STEP21, the power transmission controller 41 controls the power transmission circuit unit 11 so that the output P1 of the first energy storage device 2 coincides with the base supplied power P1_base and so that the input of the second energy storage device 3, that is, the charging power, coincides with a supplied power corresponding to the surplus power obtained by subtracting the supplied power corresponding to the driving force demand DT_dmd from the base supplied power P1_base (the surplus supplied power).

Accordingly, the base supplied power P1_base, which is set in the way described above in accordance with the detected value of the second remaining capacity SOC2, is output from the first energy storage device 2 regardless of the driving force demand DT_dmd. In addition, a supplied power corresponding to the driving force demand DT_dmd within the base supplied power P1_base is fed from the first energy storage device 2 to the electric motor 100 and the surplus supplied power obtained by subtracting the supplied power corresponding to the driving force demand DT_dmd from the base supplied power P1_base is supplied from the first energy storage device 2 to charge the second energy storage device 3.

The processing of STEP21 can be, specifically, executed in the following way, for example. A target value for the input voltage of the inverter 17 (=the output voltage of the voltage converter 15) is set in accordance with the detected value of the rotational speed of the electric motor 100 or the like. In addition, the base supplied power P1_base is set as the target value for the output power of the voltage converter 15, and a supplied power obtained by subtracting the supplied power corresponding to the driving force demand DT_dmd from the base supplied power P1_base is set as the target value for the power to be supplied from the input side of the voltage converter 16 (the second energy storage device 3 side) to the second energy storage device 3.

Further, the voltage converter 15 is controlled so as to realize the target value for the input voltage of the inverter 17 and the target value for the output power of the voltage converter 15, and the voltage converter 16 is controlled so as to realize the target value for the power to be supplied from the voltage converter 16 to the second energy storage device 3. Also, the inverter 17 is feedback-controlled so as to cause the target current corresponding to the driving force demand DT_dmd to flow through the electric motor 100.

When the base supplied power P1_base coincides with the supplied power corresponding to the driving force demand DT_dmd, the input (the charging power) of the second energy storage device 3 is zero. Thus, the voltage converter 16 is controlled to be in power supply interruption state or the contactor 13 on the second energy storage device 3 side is controlled to be turned off.

On the other hand, the determination result of STEP20 is negative within the shaded area in the medium-remaining-capacity area illustrated in FIG. 5. In this case, in STEP22, the power transmission controller 41 controls the power transmission circuit unit 11 so that the output P1 of the first energy storage device 2 coincides with the base supplied power P1_base and so that the output P2 of the second energy storage device 3 coincides with the power deficit obtained by subtracting the base supplied power P1_base from the supplied power corresponding to the driving force demand DT_dmd.

In this case, specific control of the power transmission circuit unit 11 can be performed in a manner similar to that in STEP14 in FIG. 6.

Accordingly, the supplied power corresponding to the driving force demand DT_dmd is fed from both the first energy storage device 2 and the second energy storage device 3 to the electric motor 100 in such a manner that the sum of the output P1 of the first energy storage device 2 and the output P2 of the second energy storage device 3 coincides with the supplied power corresponding to the driving force demand DT_dmd. In this case, a portion (the output P1) of the supplied power corresponding to the driving force demand DT_dmd which the first energy storage device 2 is responsible for supplying is equal to the base supplied power P1_base, which is set in the way described above in accordance with the detected value of the second remaining capacity SOC2.

As a supplementary explanation, when, in STEP22, the output P2 of the second energy storage device 3 (the power deficit obtained by subtracting the base supplied power P1_base from the supplied power corresponding to the driving force demand DT_dmd) exceeds the upper-limit supplied power that can be output by the second energy storage device 3 within the medium-remaining-capacity area, the output P2 of the second energy storage device 3 may be limited to the upper-limit supplied power and the power transmission circuit unit 11 may be controlled by using processing similar to that of STEP18.

Alternatively, the threshold value DT_th2 in the determination processing in STEP17 may be set so that a supplied power corresponding to the threshold value DT_th2 coincides with a value obtained by adding the upper-limit supplied power that can be output by the second energy storage device 3, or a nearby constant value of supplied power, to the base supplied power P1_base.

As described above, when the detected value of the second remaining capacity SOC2 falls within the medium-remaining-capacity area, power is supplied to the electric motor 100 from an energy storage device including at least the first energy storage device 2 out of the first energy storage device 2 and the second energy storage device 3 during the power-running operation of the electric motor 100.

In addition, when the driving force demand DT_dmd is less than or equal to the threshold value DT_th2, the output P1 of the first energy storage device 2 is kept at the base supplied power P1_base, which is set in accordance with the detected value of the second remaining capacity SOC2. If the base supplied power P1_base is greater than or equal to the supplied power corresponding to the driving force demand DT_dmd (in other words, if the driving force demand DT_dmd is less than or equal to the threshold value DT_th4, which is obtained by converting the base supplied power P1_base into a driving force value of the electric motor 100), a supplied power corresponding to the driving force demand DT_dmd within the base supplied power P1_base is supplied only from the first energy storage device 2 to the electric motor 100 and, at the same time, the surplus supplied power is supplied to charge the second energy storage device 3.

Furthermore, when the driving force demand DT_dmd is less than or equal to the threshold value DT_th2, if the base supplied power P1_base is smaller than the supplied power corresponding to the driving force demand DT_dmd (in other words, if the driving force demand DT_dmd is larger than the threshold value DT_th4), the base supplied power P1_base is fed from the first energy storage device 2 to the electric motor 100, whereas the power deficit is fed from the second energy storage device 3 to the electric motor 100.

Thus, when the detected value of the second remaining capacity SOC2 falls within the medium remaining capacity, a situation in which power is supplied from the second energy storage device 3 to the electric motor 100 is less likely to occur than when the detected value of the second remaining capacity SOC2 falls within the high-remaining-capacity area. In addition, as the second remaining capacity SOC2 decreases, a range for the driving force demand DT_dmd over which power is supplied from the first energy storage device 2 to charge the second energy storage device 3 increases and the charging power used to charge the second energy storage device 3 is more likely to increase.

As a result, the second remaining capacity SOC2 can be kept in the medium-remaining-capacity area as much as possible. This can prevent as much as possible the progress of deterioration of the second energy storage device 3.

Furthermore, when the driving force demand DT_dmd is less than or equal to the threshold value DT_th2, the base supplied power P1_base to be output from the first energy storage device 2 is set in accordance with the second remaining capacity SOC2 regardless of the driving force demand DT_dmd. Thus, the output P2 or the input of the second energy storage device 3 varies in accordance with a change in the driving force demand DT_dmd, whereas the output P1 of the first energy storage device 2 varies with low sensitivity to changes in the driving force demand DT_dmd.

As a result, the output P1 of the first energy storage device 2 is of high stability with less frequent variations. This can prevent as much as possible the progress of deterioration of the first energy storage device 2.

The determination result of STEP16 is negative within the low-remaining-capacity area. In this situation, then, in STEP23 (see FIG. 8), the power transmission controller 41 determines whether or not the driving force demand DT_dmd is larger than a predetermined threshold value DT_th3.

In an example of this embodiment, the predetermined threshold value DT_th3 is set to a predetermined constant value. In addition, the threshold value DT_th3 is set to a driving force value larger than a driving force that can be generated by the electric motor 100 when the base supplied power P1_base, which is set in the way described above in accordance with the second remaining capacity SOC2, is fed to the electric motor 100.

Note that the threshold value DT_th3 may be set so that a supplied power corresponding to the threshold value DT_th3 becomes equal to the upper-limit supplied power that can be output by the first energy storage device 2 (>P1_base) or a nearby constant value of supplied power.

The determination result of STEP23 is affirmative within the shaded area in the low-remaining-capacity area illustrated in FIG. 5. In this case, in STEP24, the power transmission controller 41 controls the power transmission circuit unit 11 so that the output P1 of the first energy storage device 2 coincides with a predetermined value of supplied power and so that the output P2 of the second energy storage device 3 coincides with the power deficit obtained by subtracting the output P1, which the first energy storage device 2 is responsible for supplying, from the supplied power corresponding to the driving force demand DT_dmd.

In this case, specific control of the power transmission circuit unit 11 can be performed in a manner similar to that in STEP14 in FIG. 6.

Accordingly, the supplied power corresponding to the driving force demand DT_dmd is fed from both the first energy storage device 2 and the second energy storage device 3 to the electric motor 100 in such a manner that the sum of the output P1 of the first energy storage device 2 and the output P2 of the second energy storage device 3 coincides with the supplied power corresponding to the driving force demand DT_dmd. In this case, a portion of the supplied power corresponding to the driving force demand DT_dmd which the first energy storage device 2 is responsible for supplying is equal to a predetermined value of supplied power.

In this case, the predetermined value of supplied power, which is output from the first energy storage device 2, may be, for example, an upper-limit supplied power that can be output by the first energy storage device 2 or a nearby constant value of supplied power. Alternatively, the predetermined value of supplied power may be a supplied power set to vary depending on either or both of the detected value of the first remaining capacity SOC1 and the detected value of the second remaining capacity SOC2.

On the other hand, when the determination result of STEP23 is negative, then, in STEP25, the power transmission controller 41 determines the base supplied power P1_base, which is a "base" value of the output P1 of the first energy storage device 2, in accordance with the detected value of the second remaining capacity SOC2.

The processing of STEP25 is the same or substantially the same as the processing of STEP19. In this embodiment, since the coefficient α is the maximum value "1" within the low-remaining-capacity area, the base supplied power P1_base, which is determined in STEP25, is equal to the maximum value P1b.

As in the processing of STEP19, for example, an upper limit of the output P1 of the first energy storage device 2 may be set in accordance with the detected value of the first remaining capacity SOC1 or the like, and, when the base supplied power P1_base, which is determined in accordance with the second remaining capacity SOC2, exceeds the upper limit, the base supplied power P1_base may be forcibly limited to the upper limit.

Alternatively, for example, the base supplied power P1_base may be determined, instead of by executing the process illustrated in the flowchart in FIG. 9 in STEP25, directly from the detected value of the second remaining capacity SOC2 by using a map created in advance or by using an operational expression.

After the processing of STEP25 has been executed, then, in STEP26, the power transmission controller 41 determines whether or not the supplied power corresponding to the driving force demand DT_dmd is less than or equal to the base supplied power P1_base. As in the determination processing of STEP20, the determination processing of STEP26 is equivalent to a process of determining whether or not the driving force demand DT_dmd is less than or equal to the threshold value DT_th4 (see FIG. 5), which is obtained by converting the base supplied power P1_base into a driving force value in accordance with the detected value of the rotational speed of the electric motor 100.

The determination result of STEP26 is affirmative within the diagonally hatched area in the low-remaining-capacity area illustrated in FIG. 5 when the driving force demand DT_dmd is less than or equal to the threshold value DT_th4. In this situation, in STEP27, the power transmission controller 41 controls the power transmission circuit unit 11 so that the output P1 of the first energy storage device 2 coincides with the base supplied power P1_base and so that the input (the charging power) of the second energy storage device 3 coincides with a supplied power corresponding to the surplus power obtained by subtracting the supplied power corresponding to the driving force demand DT_dmd from the base supplied power P1_base.

In this case, specific control of the power transmission circuit unit 11 can be performed in a manner similar to that in STEP21 in FIG. 7.

Accordingly, the base supplied power P1_base, which is set in the way described above in accordance with the detected value of the second remaining capacity SOC2, is output from the first energy storage device 2 regardless of the driving force demand DT_dmd. In addition, a supplied power corresponding to the driving force demand DT_dmd within the base supplied power P1_base is fed from the first energy storage device 2 to the electric motor 100 and the surplus supplied power obtained by subtracting the supplied power corresponding to the driving force demand DT_dmd from the base supplied power P1_base is supplied from the first energy storage device 2 to charge the second energy storage device 3.

On the other hand, the determination result of STEP26 is negative within the diagonally hatched area in the low-remaining-capacity area illustrated in FIG. 5 when the driving force demand DT_dmd is larger than the threshold value DT_th4. In this case, in STEP28, the power transmission controller 41 controls the power transmission circuit unit 11 so that the output P1 of the first energy storage device 2 coincides with the supplied power corresponding to the driving force demand DT_dmd.

Accordingly, the supplied power corresponding to the driving force demand DT_dmd is fed to the electric motor 100 only from the first energy storage device 2 without using the second energy storage device 3.

The processing of STEP28 can be, specifically, executed in the following way, for example. A target value for the input voltage of the inverter 17 (=the output voltage of the voltage converter 15) is set in accordance with the detected value of the rotational speed of the electric motor 100 or the like. In addition, the supplied power corresponding to the driving force demand DT_dmd is set as the target value for the output power of the voltage converter 15.

Further, the voltage converter 15 is controlled by using a control signal (duty signal) so as to realize the target value for the input voltage of the inverter 17 and the target value for the output power of the voltage converter 15. Also, the inverter 17 is feedback-controlled by using a control signal (duty signal) so as to cause a target current to flow through the electric motor 100. The target current is a current that can realize a target power set in accordance with the driving force demand DT_dmd or a target power obtained by limiting the target power through a limiting process (a limiting process for limiting the output of the first energy storage device 2).

Further, the voltage converter 16 is controlled to be in power supply interruption state. Alternatively, the contactor 13 on the second energy storage device 3 side is controlled to be turned off.

As described above, when the detected value of the second remaining capacity SOC2 falls within the low-remaining-capacity area, power is supplied to the electric motor 100 from an energy storage device including at least the first energy storage device 2 out of the first energy storage device 2 and the second energy storage device 3 during the power-running operation of the electric motor 100.

In addition, when the supplied power corresponding to the driving force demand DT_dmd is less than or equal to the base supplied power P1_base, the output P1 of the first energy storage device 2 is kept at the base supplied power P1_base regardless of the driving force demand DT_dmd. Then, a supplied power corresponding to the driving force demand DT_dmd within the base supplied power P1_base is supplied P1_ base from the first energy storage device 2 to the electric motor 100 and, at the same time, the surplus supplied power is used to charge the second energy storage device 3. Thus, the input of the second energy storage device 3 varies in accordance with a change in the driving force demand DT_dmd, whereas the output P1 of the first energy storage device 2 (=P1_base) varies with low sensitivity to changes in the driving force demand DT_dmd.

In addition, when the supplied power corresponding to the driving force demand DT_dmd is larger than the base supplied power P1_base, the supplied power corresponding to the driving force demand DT_dmd is supplied only from the first energy storage device 2 to the electric motor 100 until the driving force demand DT_dmd exceeds the threshold value DT_th3. Only when the driving force demand DT_dmd exceeds the threshold value DT_th3, the second energy storage device 3 is responsible for supplying a portion of the supplied power corresponding to the driving force demand DT_dmd.

Thus, when the detected value of the second remaining capacity SOC2 falls within the low-remaining-capacity area, a situation in which power is supplied from the second energy storage device 3 to the electric motor 100 is less likely to occur than when the detected value of the second remaining capacity SOC2 falls within the high-remaining-capacity area or the medium-remaining-capacity area.

In addition, since the base supplied power P1_base is the maximum value P1b within the low-remaining-capacity area, a range for the driving force demand DT_dmd over which power is supplied from the first energy storage device 2 to charge the second energy storage device 3 and the charging power are larger than those for the medium-remaining-capacity area.

As a result, unless a situation in which the driving force demand DT_dmd is larger than the threshold value DT_th3 continues, the second remaining capacity SOC2 is likely to return from the low-remaining-capacity area to the medium-remaining-capacity area.

When the supplied power corresponding to the driving force demand DT_dmd is less than or equal to the base supplied power P1_base, furthermore, the base supplied power P1_base to be output from the first energy storage device 2 is set in accordance with the second remaining capacity SOC2 regardless of the driving force demand DT_dmd. In particular, the base supplied power P1_base is a constant value (=P1b) within the low-remaining-capacity area. Thus, the output P1 of the first energy storage device 2 does not vary in accordance with a change in the driving force demand DT_dmd.

In addition, the output P1 of the first energy storage device 2 is set to a predetermined constant value when the driving force demand DT_dmd is larger than the threshold value DT_th3, which can prevent the output P1 of the first energy storage device 2 from varying in accordance with the driving force demand DT_dmd.

As a result, the output P1 of the first energy storage device 2 within the low-remaining-capacity area is of high stability with less frequent variations. This can prevent as much as possible the progress of deterioration of the first energy storage device 2.

The normal combined-use control process when the control mode is set to the first control mode, which is a basic control mode among the first to third control modes, has been described in detail.

Second Control Mode

There will now be described the normal combined-use control process when the control mode is set to the second control mode.

Figure 11:
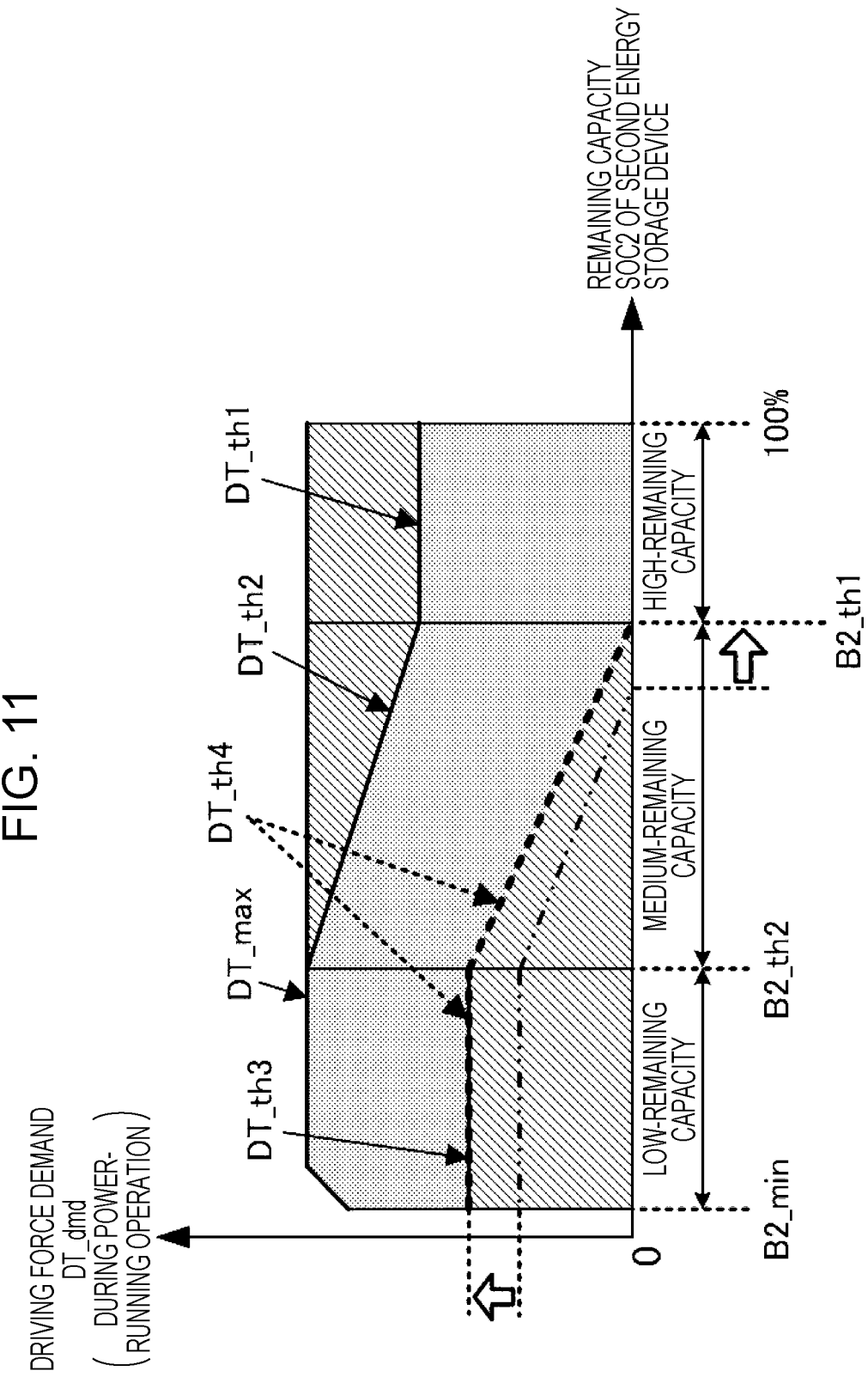
FIG. 11 illustrates, in map form, the relationship between a driving force demand and the remaining capacity of the second energy storage device in the normal combined-use control process in a second control mode, which is executed in STEP4 in FIG. 4.

FIG. 11 illustrates, in map form, the relationship in the second control mode between the second remaining capacity SOC2 and the proportion of powers to be output by the first energy storage device 2 and the second energy storage device 3 with respect to the amount of electricity to be supplied (the supplied power) to the electric motor 100 in accordance with the driving force demand DT_dmd of the electric motor 100. In FIG. 11, the meanings of the diagonally hatched areas and the shaded areas are similar to those in FIG. 5. In FIG. 11, a two-dot chain line indicates the line representing the threshold value DT_th4, which is indicated by the broken line in FIG. 5, for comparison with the first control mode.

The comparison between FIG. 5 illustrating the first control mode and FIG. 11 illustrating the second control mode demonstrates that the second control mode is a control mode in which threshold values used to define the proportion of powers to be output by the first energy storage device 2 and the second energy storage device 3 are different from those in the first control mode.

In the second control mode according to this embodiment, when the second remaining capacity SOC2 is comparatively low, the second energy storage device 3 is more likely to be charged than in the first control mode. When the second remaining capacity SOC2 is comparatively high, a range for the driving force demand DT_dmd over which power is supplied from the second energy storage device 3 to the electric motor 100 is larger than that in the first control mode.

More specifically, in the second control mode according to this embodiment, the threshold value B2_th1 for the second remaining capacity SOC2, which is the upper limit of the medium-remaining-capacity area, is set in advance to a value higher than that in the first control mode.

In addition, the base supplied power P1_base of the first energy storage device 2 within the low-remaining-capacity area and the medium-remaining-capacity area of the second energy storage device 3 is determined in accordance with the detected value of the second remaining capacity SOC2 so that the base supplied power P1_base is larger than that in the first control mode (in other words, so that the threshold value DT_th4 obtained by converting the base supplied power Pi base into a driving force value in accordance with the rotational speed of the electric motor 100 (a value calculated with a constant rotational speed) is larger than that in the first control mode).

The base supplied power P1_base can be determined in a way similar to that in the first control mode. For example, as in the first control mode, the base supplied power P1_base ($=\alpha \times P1b$) can be determined by using a process similar to the process illustrated in the flowchart in FIG. 9. In this case, however, the maximum value P1$b$ of the base supplied power P1_base is set in advance to a value larger than that in the first control mode. In the second control mode, the maximum value P1$b$ of the base supplied power P1_base may be, for example, an upper-limit supplied power that can be output from the first energy storage device 2 or a nearby supplied power.

The base supplied power P1_base in the second control mode may be determined directly from, for example, the detected value of the second remaining capacity SOC2 by using a map created in advance or by using an operational expression.

In the second control mode, furthermore, the threshold value DT_th1 for the driving force demand DT_dmd within the high-remaining-capacity area and the threshold value DT_th2 for the driving force demand DT_dmd within the medium-remaining-capacity area are set to values larger than those in the first control mode.

In the example illustrated in FIG. 11, furthermore, the threshold value DT_th3 for the driving force demand DT_dmd within the low-remaining-capacity area is set so that the supplied power corresponding to the threshold value DT_th3 coincides with the base supplied power P1_base. However, the supplied power corresponding to the threshold value DT_th3 may be larger than the base supplied power P1_base so long as the supplied power corresponding to the threshold value DT_th3 is less than or equal to the upper-limit supplied power that can be output from the first energy storage device 2.

The way in which threshold values related to the second remaining capacity SOC2 and the driving force demand DT_dmd in the second control mode are set is the same or substantially the same as that in the first control mode, except the particulars described above.

The normal combined-use control process in the second control mode is executed in accordance with the flowchart illustrated in FIG. 6 to FIG. 8 described above in a way similar to that in the first control mode. Note that the processing of STEP26 and STEP28 in FIG. 8 may be omitted when the threshold value DT_th3 for the driving force demand DT_dmd within the low-remaining-capacity area is set so that the supplied power corresponding to the threshold value DT_th3 coincides with the base supplied power P1_base.

The normal combined-use control process in the second control mode is executed in the way described above.

In the second control mode, a remaining capacity area (low-side remaining capacity area) obtained by combining the low-remaining-capacity area and the medium-remaining-capacity area is larger than that in the first control mode, and a range for the driving force demand DT_dmd over which power is supplied from the first energy storage device 2 to charge the second energy storage device 3 within the low-side remaining capacity area is larger than that in the first control mode. Thus, the second remaining capacity SOC2 is more likely to be kept in a state near the high-remaining-capacity area.

In addition, a range for the driving force demand DT_dmd over which power is supplied from the second energy storage device 3 to the electric motor 100 within the medium-remaining-capacity area and the high-remaining-capacity area is also larger than that in the first control mode.

As a result, when the driving force demand DT_dmd is comparatively large (when the relationship of DT_dmd>DT_th4 holds), the supplied power to the electric motor 100 can be changed over a wide range for the driving force demand DT_dmd with high responsivity to changes in the driving force demand DT_dmd. This results in an increase in the responsivity of the actual driving force of the electric motor 100 to changes in the driving force demand DT_dmd.

In this embodiment, the threshold value B2_th1 for the second remaining capacity SOC2, which is the upper limit of the medium-remaining-capacity area, and the base supplied power P1_base of the first energy storage device 2 are both set to values larger than those in the first control mode. Alternatively, only one of the threshold value B2_th1 and the base supplied power P1_base may be set to a value larger than that in the first control mode. This also allows the area within which power is supplied from the first energy storage device 2 to change the second energy storage device 3 to be larger than that in the first control mode.

Third Control Mode

There will now be described the normal combined-use control process when the control mode is set to the third control mode.

Figure 12:
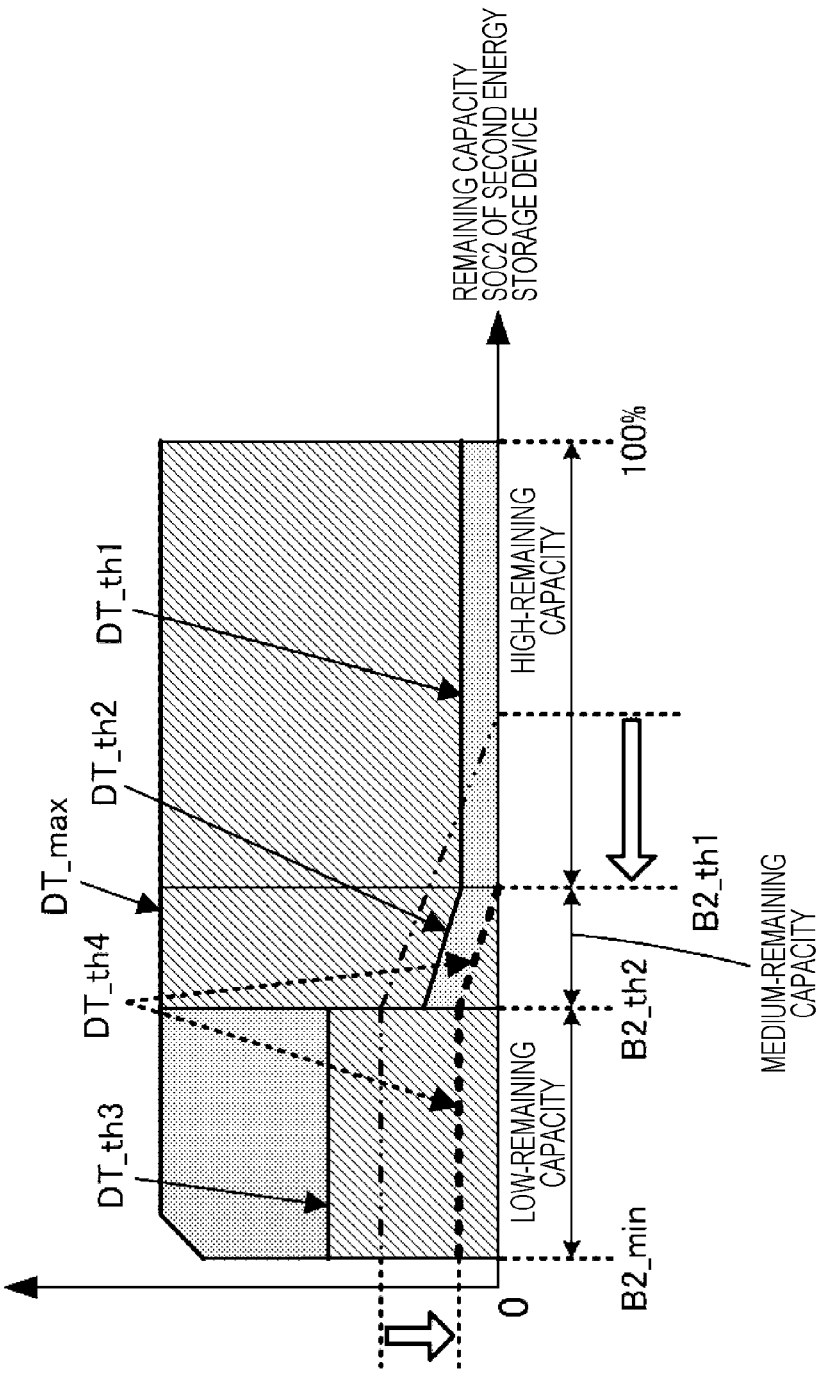
FIG. 12 illustrates, in map form, the relationship between a driving force demand and the remaining capacity of the second energy storage device in the normal combined-use control process in a third control mode, which is executed in STEP4 in FIG. 4.

FIG. 12 illustrates, in map form, the relationship in the third control mode between the second remaining capacity SOC2 and the proportion of powers to be output by the first energy storage device 2 and the second energy storage device 3 with respect to the amount of electricity to be supplied (the supplied power) to the electric motor 100 in accordance with the driving force demand DT_dmd of the electric motor 100. In FIG. 12, the meanings of the diagonally hatched areas and the shaded areas are similar to those in FIG. 5. In FIG. 12, a two-dot chain line indicates the line representing the threshold value DT_th4, which is indicated by the broken line in FIG. 5, for comparison with the first control mode.

The comparison between FIG. 5 illustrating the first control mode and FIG. 12 illustrating the third control mode demonstrates that the third control mode is a control mode in which threshold values used to define the proportion of powers to be output by the first energy storage device 2 and the second energy storage device 3 are different from those in the first control mode.

In the third control mode according to this embodiment, even when the second remaining capacity SOC2 is comparatively low, the second energy storage device 3 is less likely to be charged than in the first control mode. When the second remaining capacity SOC2 is comparatively high, a range for the driving force demand DT_dmd over which power is supplied from the first energy storage device 2 to the electric motor 100 is larger than that in the first control mode.

More specifically, in the third control mode according to this embodiment, the threshold value B2_th1 for the second remaining capacity SOC2, which is the upper limit of the medium-remaining-capacity area, is set in advance to a value lower than that in the first control mode.

In addition, the base supplied power P1_base of the first energy storage device 2 within the low-remaining-capacity area and the medium-remaining-capacity area of the second energy storage device 3 is determined in accordance with the detected value of the second remaining capacity SOC2 so that the base supplied power P1_base is lower than that in the first control mode (in other words, so that the threshold value DT_th4 obtained by converting the base supplied power P1_base into a driving force value in accordance with the rotational speed of the electric motor 100 (a value calculated with a constant rotational speed) is smaller than that in the first control mode).

The base supplied power P1_base can be determined in a way similar to that in the first control mode. For example, as in the first control mode, the base supplied power P1_base (=α×P1b) can be determined by using a process similar to the process illustrated in the flowchart in FIG. 9. In this case, however, the maximum value P1b of the base supplied power P1_base is set in advance to a value smaller than that in the first control mode.

The base supplied power P1_base in the third control mode may be set directly from, for example, the detected value of the second remaining capacity SOC2 by using a map created in advance or by using an operational expression.

In the third control mode, furthermore, the threshold value DT_th1 for the driving force demand DT_dmd within the high-remaining-capacity area and the threshold value DT_th2 for the driving force demand DT_dmd within the medium-remaining-capacity area are set to values smaller than those in the first control mode.

The way in which threshold values related to the second remaining capacity SOC2 and the driving force demand DT_dmd in the third control mode are set is the same or substantially the same as that in the first control mode, except the particulars described above.

The normal combined-use control process in the third control mode is executed in accordance with the flowchart illustrated in FIG. 6 to FIG. 8 described above in a way similar to that in the first control mode.

The normal combined-use control process in the third control mode is executed in the way described above.

In the third control mode, a remaining capacity area (low-side remaining capacity area) obtained by combining the low-remaining-capacity area and the medium-remaining-capacity area is smaller than that in the first control mode, and a range for the driving force demand DT_dmd over which power is supplied from the first energy storage device 2 to charge the second energy storage device 3 within the low-side remaining capacity area is smaller than that in the first control mode. Thus, a situation in which power is supplied from the first energy storage device 2 to charge the second energy storage device 3 is less likely to occur.

The power loss caused by the charging operation described above can be reduced compared to that in the first control mode and the second control mode. As a result, the amount of electrical energy consumed by all of the first energy storage device 2 and the second energy storage device 3 per unit distance of travel of the vehicle can be reduced compared to that in the first control mode and the second control mode. This results in an extension of the drivable range of the vehicle.

In this embodiment, the threshold value B2_th1 for the second remaining capacity SOC2, which is the upper limit of the medium-remaining-capacity area, and the base supplied power P1_base of the first energy storage device 2 are both set to values smaller than those in the first control mode. Alternatively, only one of the threshold value B2_th1 and the base supplied power P1_base may be set to a value smaller than that in the first control mode. This also allows the area within which power is supplied from the first energy storage device 2 to change the second energy storage device 3 to be smaller than that in the first control mode.

A brief summary of the first to third control modes described above is presented below. The first control mode is a so-called "long-lasting mode", which is used mainly to let the first energy storage device 2 and the second energy storage device 3 deteriorate as little as possible. The second control mode is a so-called "sport mode", which is used mainly to enhance responsivity to the driving force demand DT_dmd of the electric motor 100. The third control mode is a so-called "eco mode", which is used mainly to enhance the fuel economy performance of the vehicle (the distance traveled by the vehicle per unit of electrical energy consumed).

Extended-Stop Control Process

The extended-stop control process in STEP6 described above will now be described in detail.

In the extended-stop control process, the power transmission controller 41 controls the power transmission circuit unit 11 to supply only the deficit against the supplied power corresponding to the driving force demand DT_dmd from the second energy storage device 3 to the electric motor 100 while supplying power from the first energy storage device 2 to the electric motor 100 as continuously as possible during the power-running operation of the electric motor 100.

Figure 13:
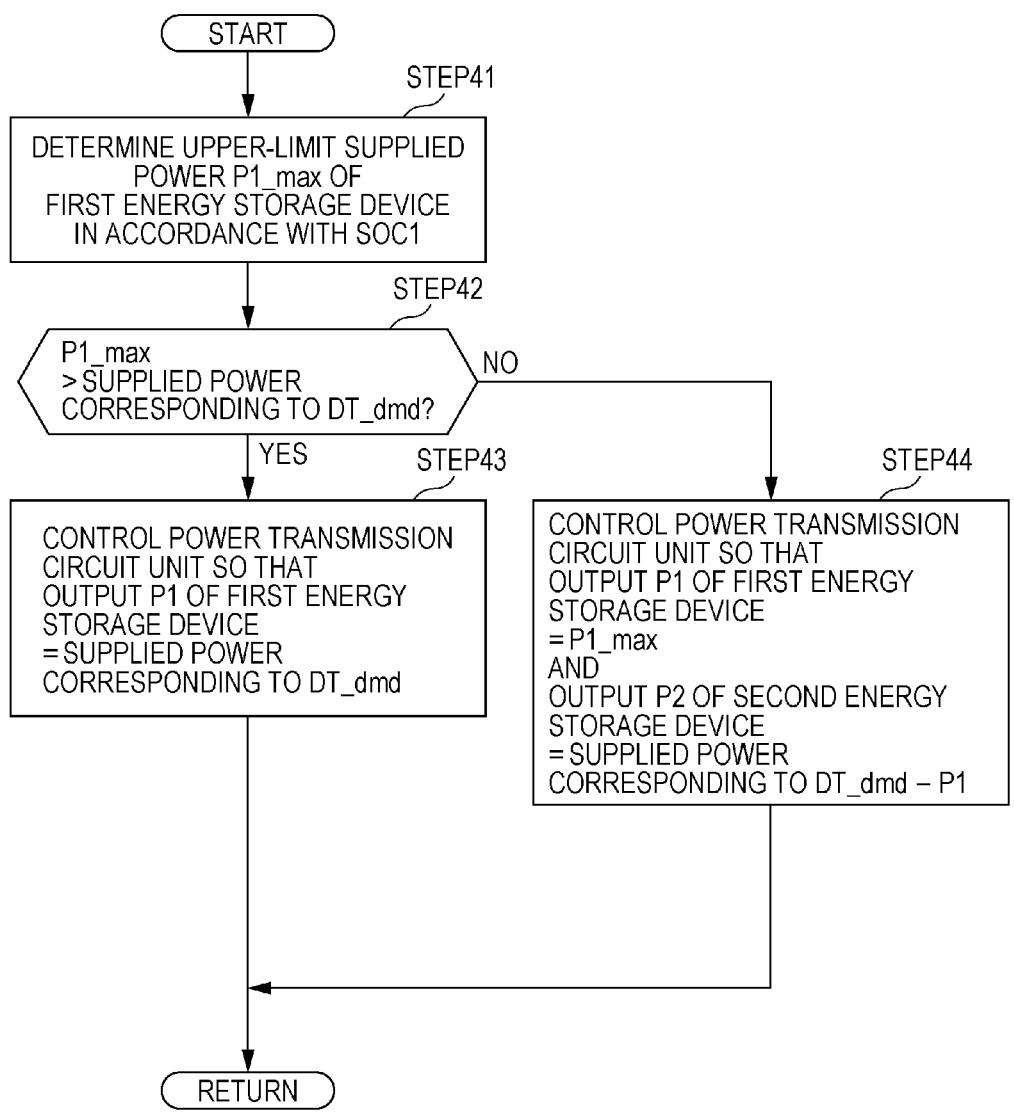
FIG. 13 is a flowchart illustrating an extended-stop control process executed in STEP6 in FIG. 4.

In the extended-stop control process, the power transmission controller 41 executes a process illustrated in a flowchart in FIG. 13 at intervals of a predetermined control process period. Specifically, in STEP41, the power transmission controller 41 determines an upper-limit supplied power P1_max that can be output from the first energy storage device 2, in accordance with the detected value of the first remaining capacity SOC1.

Figure 15:
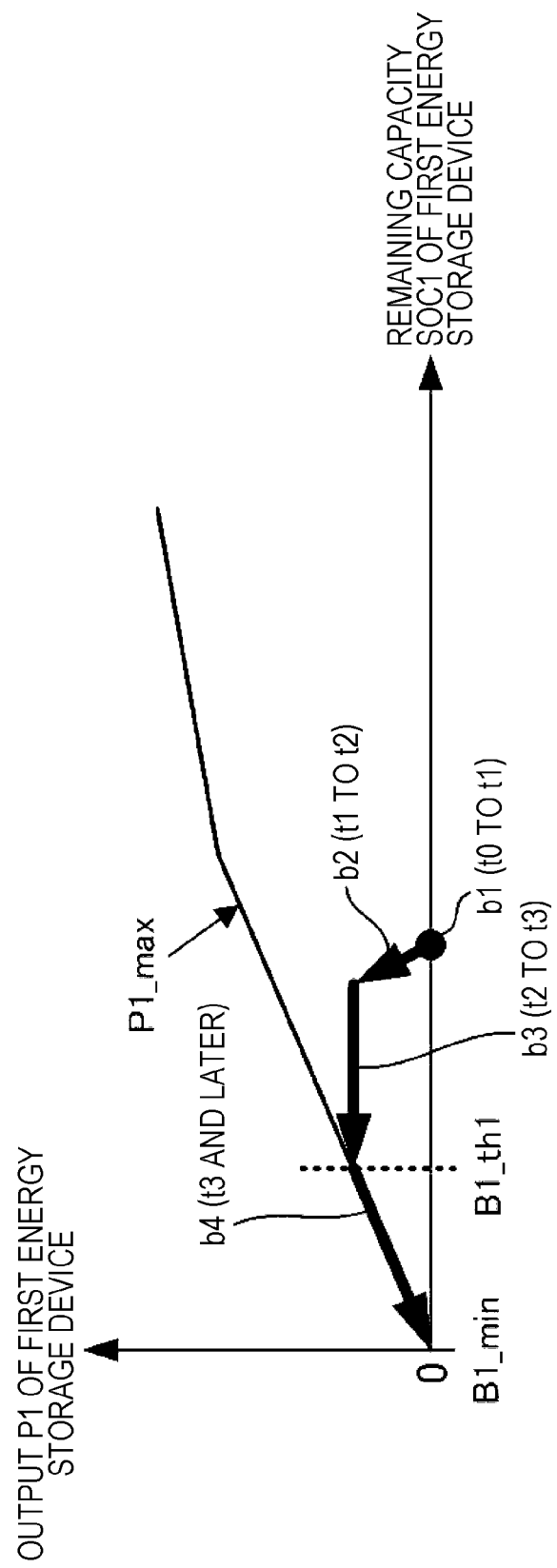
FIG. 15 is a graph illustrating an example of changes in the remaining capacity of the first energy storage device over time.

The upper-limit supplied power P1_max is determined from the detected value of the first remaining capacity SOC1, for example, in a manner depicted on a graph in FIG. 15 by using a map created in advance or by using an operational expression. The upper-limit supplied power P1_max is determined to be a value that becomes smaller as the first remaining capacity SOC1 decreases.

Then, in STEP42, the power transmission controller 41 determines whether or not the upper-limit supplied power P1_max is larger than the supplied power corresponding to the driving force demand DT_dmd.

If the determination result of STEP42 is affirmative, in STEP43, the power transmission controller 41 controls the power transmission circuit unit 11 so that the output P1 of the first energy storage device 2 coincides with the supplied power corresponding to the driving force demand DT_dmd.

In this case, specific control of the power transmission circuit unit 11 can be performed in a manner similar to that in STEP28 in FIG. 8.

On the other hand, if the determination result of STEP42 is negative, in STEP44, the power transmission controller 41 controls the power transmission circuit unit 11 so that the output P1 of the first energy storage device 2 coincides with the upper-limit supplied power P1_max and so that the output P2 of the second energy storage device 3 coincides with the power deficit obtained by subtracting the output P1 of the first energy storage device 2 (=P1_max) from the supplied power corresponding to the driving force demand DT_dmd.

In this case, specific control of the power transmission circuit unit 11 can be performed in a manner similar to that in STEP14 in FIG. 6.

In STEP44, when the detected value of the first remaining capacity SOC1 has reached the lower limit value B1_min and the upper-limit supplied power P1_max=0 holds, the supplied power corresponding to the driving force demand DT_dmd is supplied only from the second energy storage device 3 to the electric motor 100. In this situation, the voltage converter 15 of the power transmission circuit unit 11 is controlled to be in power supply interruption state or the contactor 12 on the first energy storage device 2 side is controlled to be turned off.

The extended-stop control process is executed in the way described above. In the extended-stop control process, the first energy storage device 2 from which it is difficult to output a high supplied power is preferentially used to supply power to the electric motor 100. Even when the upper-limit supplied power P1_max, which can be output by the first energy storage device 2, is not sufficient for the supplied power corresponding to the driving force demand DT_dmd, power is supplied from both the first energy storage device 2 and the second energy storage device 3 to the electric motor 100, allowing the first energy storage device 2 to be discharged to the remaining capacity corresponding to the lower limit value B1_min.

Thereafter, the second energy storage device 3 from which it is easy to outputs a high supplied power is used to supply power to the electric motor 100. This allows the second energy storage device 3 to be discharged to the remaining capacity corresponding to the lower limit value B2_min or to a nearby remaining capacity.

An example of changes in the first remaining capacity SOC1 and the second remaining capacity SOC2 through the normal combined-use control process and extended-stop control process described above will now be described with reference to FIG. 14 to FIG. 16.

In the illustrated example, the control mode in the normal combined-use control process is the first control mode, by way of example.

Figure 14:
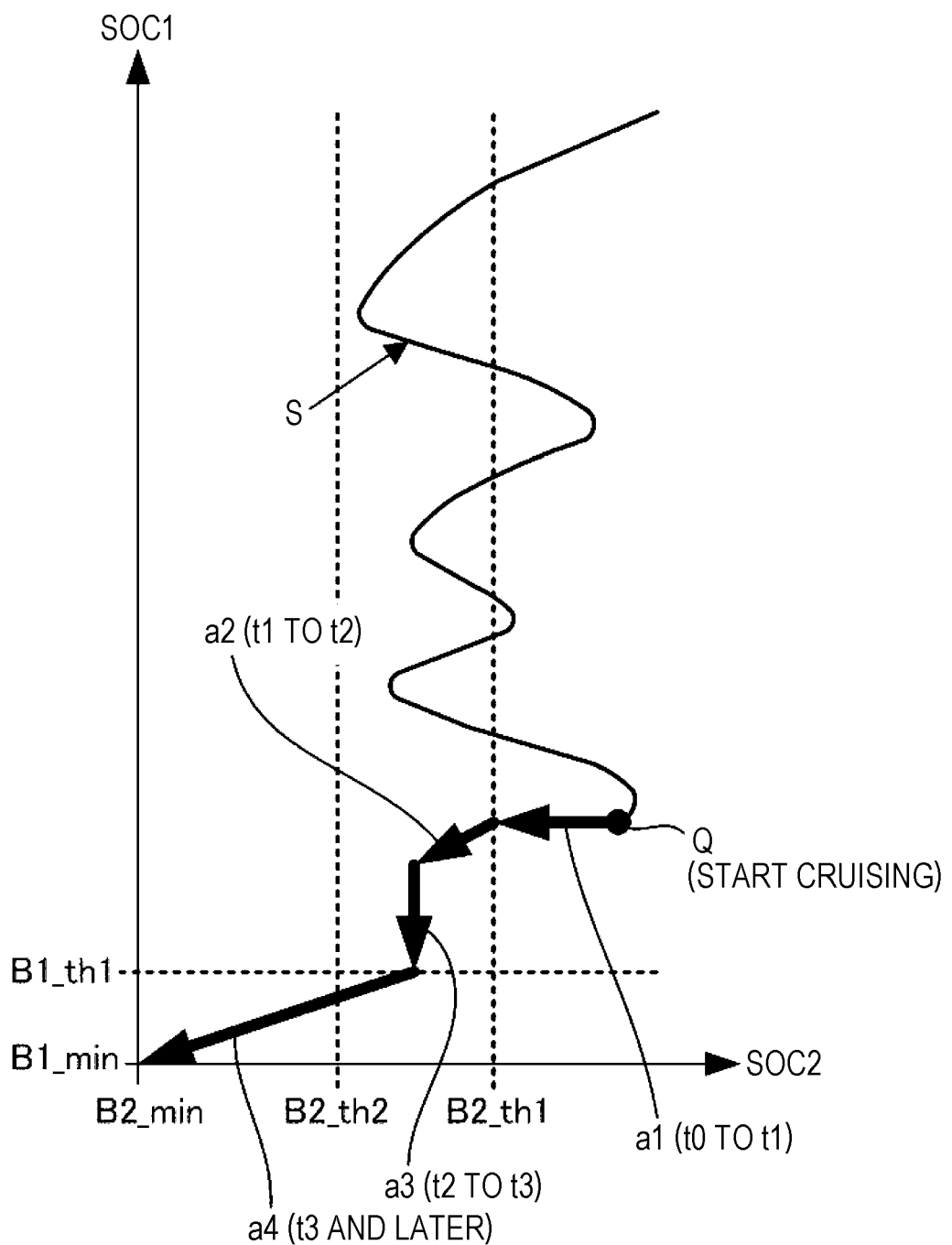
FIG. 14 is a graph illustrating an example of changes in a combination of the respective remaining capacities of a first energy storage device and the second energy storage device over time.

FIG. 14 illustrates a graph S, which depicts, by way of example, in which pattern the combination of the first remaining capacity SOC1 and the second remaining capacity SOC2 changes when the vehicle is traveling with the normal combined-use control process being executed.

The graph S demonstrates that the second remaining capacity SOC2 increases or decreases so as to be kept at, for example, a value near the threshold value B2_th1 by appropriately charging the second energy storage device 3 with power supplied from the first energy storage device 2, whereas the first remaining capacity SOC1 decreases.

In FIG. 14, thick-line arrows a1 to a4 indicate how the combination of the first remaining capacity SOC1 and the second remaining capacity SOC2 changes when the vehicle starts cruising at, for example, the time point (time t0) at which the combination of the first remaining capacity SOC1 and the second remaining capacity SOC2 is in a state indicated by a point Q. Cruising is movement of a vehicle with the driving force demand DT_dmd of the electric motor 100 and the rotational speed being kept substantially constant.

In FIG. 15, a point b1 and thick-line arrows b2 to b4 indicate changes in the first remaining capacity SOC1 from the time to. In FIG. 16, thick-line arrows c1 and c2, a point c3, and a thick-line arrow c4 indicate changes in the second remaining capacity SOC2 from the time t0.

The indications a1, b1, and c1 represent the time period from the time t0 to time t1, the indications a2, b2, and c2 represent the time period from the time t1 to time t2, the indications a3, b3, and c3 represent the time period from the time t2 to time t3, and the indications a4, b4, and c4 represent the time period after the time t3. The time t3 is a time at which the extended-stop control process is started in response to the first remaining capacity SOC1 reaching the threshold value B1_th1. In addition, the driving force demand DT_dmd of the electric motor 100 which is cruising has a value positioned at the height indicated by c1, c2, c3, and c4 in FIG. 16, for example.

Figure 16:
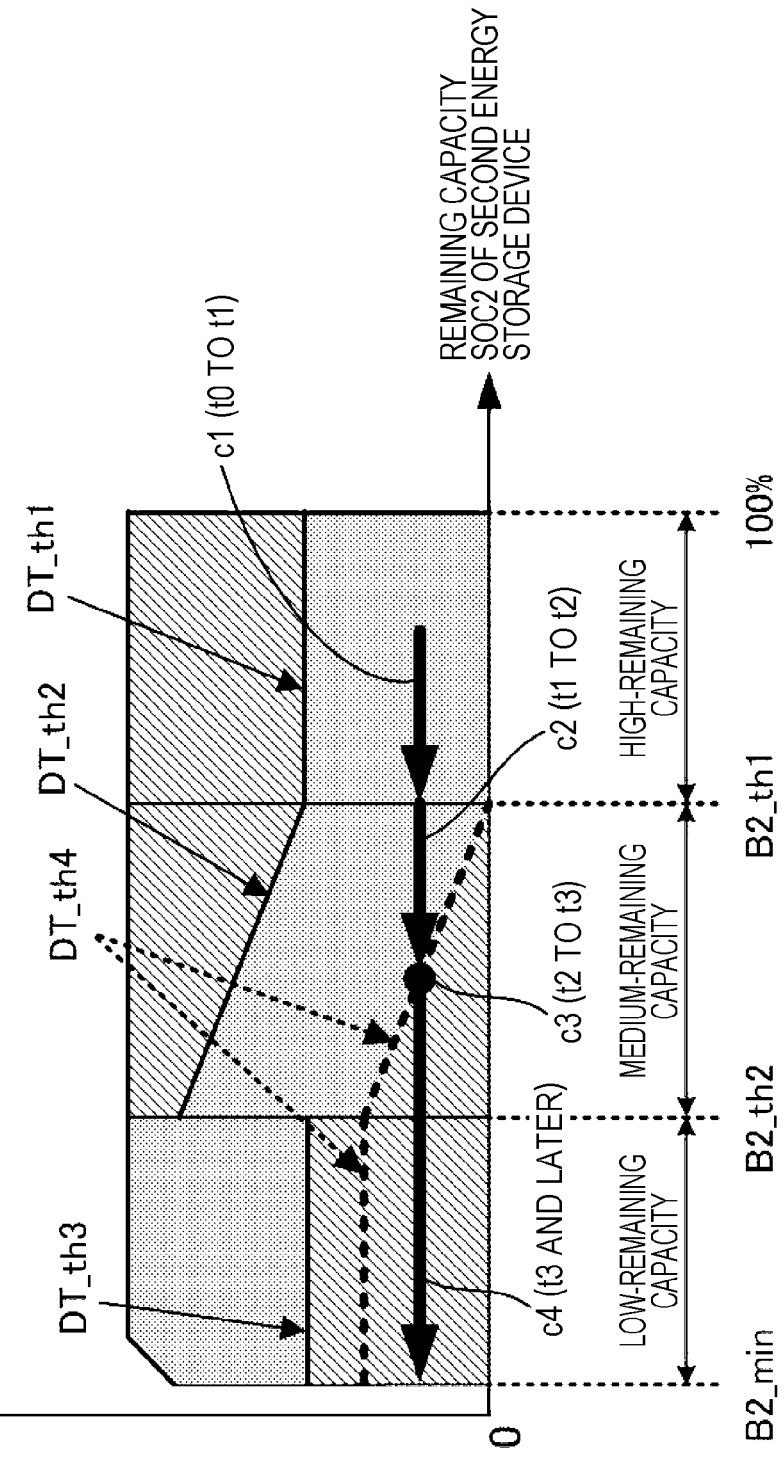
FIG. 16 is a graph illustrating an example of changes in the remaining capacity of the second energy storage device over time.

During the time period from the time t0 to the time t1, through the normal combined-use control process in the first control mode, no power is supplied from the first energy storage device 2 to the electric motor 100 or nor is the second energy storage device 3 charged with power supplied from the first energy storage device 2, and power is supplied only from the second energy storage device 3 to the electric motor 100 (see FIG. 16). Thus, as indicated by way of example by the arrow al in FIG. 14 and the point b1 in FIG. 15, the first remaining capacity SOC1 is kept constant. In addition, as indicated by way of example by the arrow a1 in FIG. 14 and the arrow c1 in FIG. 16, the second remaining capacity SOC2 decreases.

When the second remaining capacity SOC2 reaches the threshold value B2_th1 at the time t1, then, during the time period from the time t1 to the time t2, through the normal combined-use control process in the first control mode, power is supplied from both the first energy storage device 2 and the second energy storage device 3 to the electric motor 100 (see FIG. 16). Thus, as indicated by way of example by the arrow a2 in FIG. 14 and the arrow b2 in FIG. 15, the first remaining capacity SOC1 decreases and, as indicated by way of example by the arrow a2 in FIG. 14 and the arrow c2 in FIG. 16, the second remaining capacity SOC2 decreases.

When the second remaining capacity SOC2 reaches the value corresponding to the point c3 in FIG. 16 at the time t2, through the normal combined-use control process in the first control mode, power is supplied only from the first energy storage device 2 to the electric motor 100. Thus, during the time period from the time t2 to the time t3, as indicated by way of example by the arrow a3 in FIG. 14 and the point c3 in FIG. 16, the second remaining capacity SOC2 is kept constant. Then, as indicated by way of example by the arrow a3 in FIG. 14 and the arrow b3 in FIG. 15, the first remaining capacity SOC1 decreases.

When the first remaining capacity SOC1 decrease to the threshold value B1_th1 at the time t3, the extended-stop control process is started. Thus, after the time t3, as indicated by way of example by the arrow a4 in FIG. 14 and the arrow b4 in FIG. 15, the first remaining capacity SOC1 decreases to the lower limit value B1_min while the first energy storage device 2 outputs the upper-limit supplied power P1_max. In addition, as indicated by way of example by the arrow a4 in FIG. 14 and the arrow c4 in FIG. 16, the second remaining capacity SOC2 decreases to the lower limit value B2_min.

Figure 17:
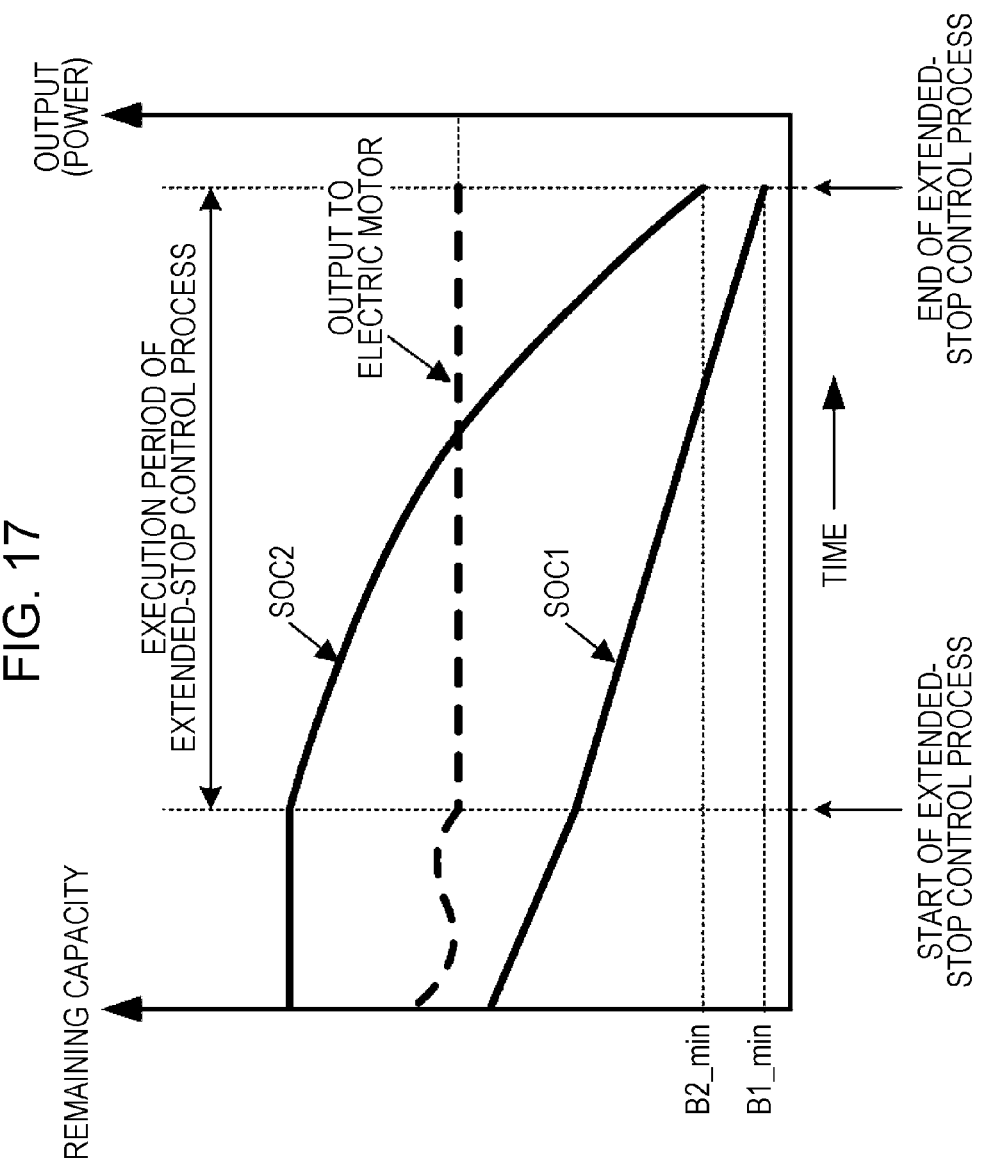
FIG. 17 is a graph illustrating an example of changes in the remaining capacity of the first energy storage device and the second energy storage device over time within a period during which the extended-stop control process is executed.

FIG. 17 illustrates an example of changes in the first remaining capacity SOC1 and the second remaining capacity SOC2 over time in the extended-stop control process. The illustrated example provides an example of changes in the first remaining capacity SOC1 and the second remaining capacity SOC2 over time when the output (the supplied power) to the electric motor 100 is kept at a certain constant value (that is, when the vehicle is cruising) after the start of the extended-stop control process.

As illustrated in FIG. 17, power is supplied from both the first energy storage device 2 and the second energy storage device 3 to the electric motor 100, thereby ensuring a constant value of supplied power to the electric motor 100 and also allowing the respective remaining capacities SOC1 and SOC2 of the first energy storage device 2 and the second energy storage device 3 to be consumed to the respective lower limit values B1_min and B2_min.

In the manner described above, an extension of the period during which power can be supplied to the electric motor 100 with the use of both the first energy storage device 2 and the second energy storage device 3 allows the power of both the first energy storage device 2 and the second energy storage device 3 to be exhausted more fully than an extension of the period during which power can be supplied to the electric motor 100 with the use of either energy storage device (e.g., the first energy storage device 2). This can result in a further extension of the period during which power can be supplied to the electric motor 100, leading to an extension of the drivable range of the vehicle.

As described above, in particular, in the normal combined-use control process in the first control mode, the first remaining capacity SOC1 can be reduced while the second remaining capacity SOC2 is held in the medium-remaining-capacity area or at a nearby value.

In the extended-stop control process, furthermore, the first energy storage device 2 and the second energy storage device 3 can be discharged fully to the respective lower limit values B1_min and B2_min or to nearby remaining capacity values to supply power to the electric motor 100.

Control Process during Regenerative Operation

There will now be described a control process for the power transmission controller 41 during the regenerative operation of the electric motor 100.

Figure 18:
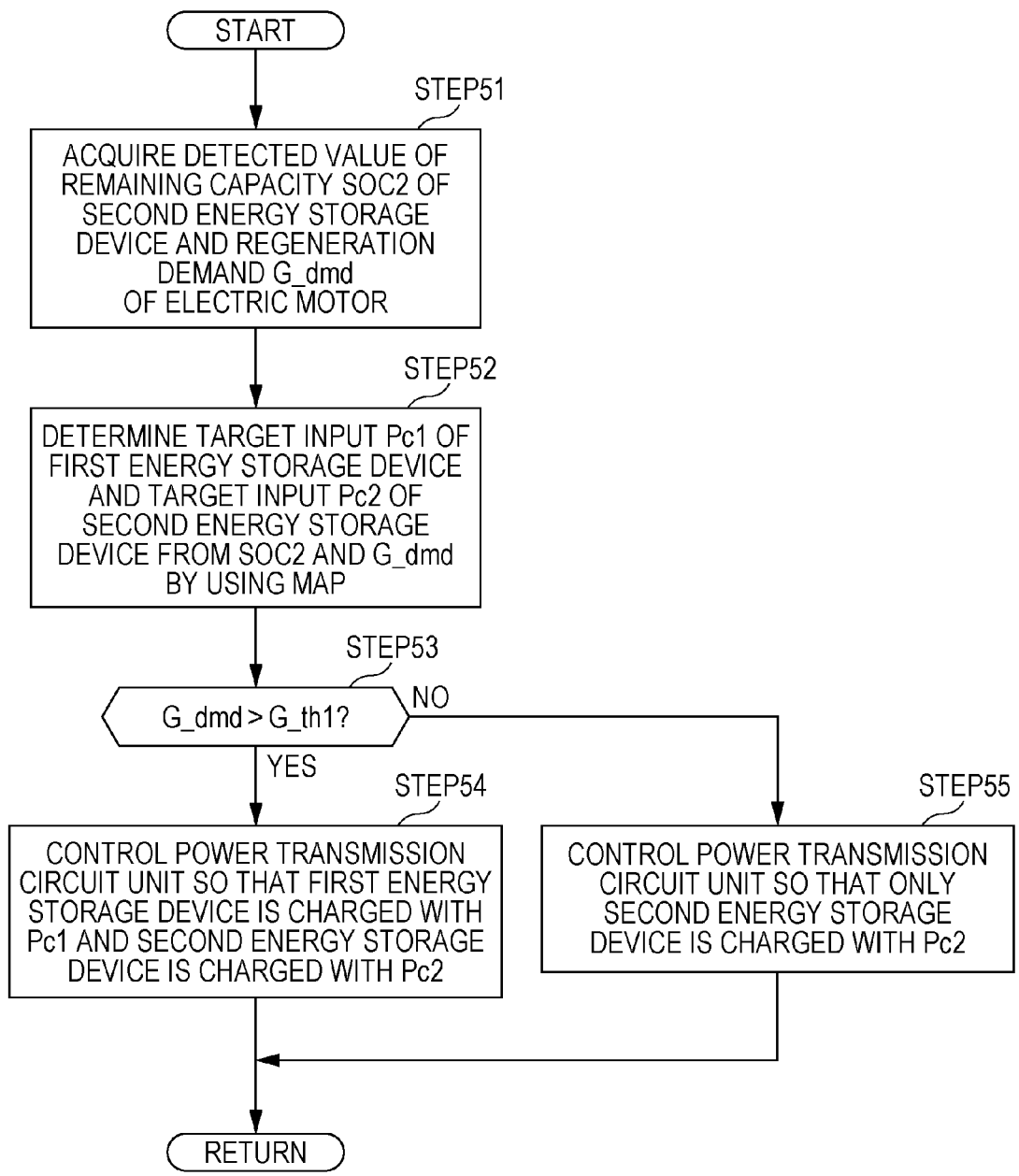
FIG. 18 is a flowchart illustrating a control process for the control device during a regenerative operation of an electric motor (first embodiment).

In this embodiment, the control process for the power transmission controller 41 during the regenerative operation of the electric motor 100 is executed at intervals of a predetermined control process period in a way illustrated in a flowchart in FIG. 18.

Specifically, in STEP51, the power transmission controller 41 acquires a detected value of the second remaining capacity SOC2 and a regeneration demand G_dmd of the electric motor 100. In this embodiment, the regeneration demand G_dmd is a request value for power to be generated by the electric motor 100 (an amount of energy generated per unit time).

The regeneration demand G_dmd is determined from, for example, a braking force demand during the regenerative operation of the electric motor 100 and a detected value of the rotational speed of the electric motor 100 by using a map created in advance or by using an operational expression.

Then, in STEP52, the power transmission controller 41 determines the respective target inputs Pc1 and Pc2 (target charging powers) of the first energy storage device 2 and the second energy storage device 3 from the detected value of the second remaining capacity SOC2 and the regeneration demand G_dmd of the electric motor 100 on the basis of a map created in advance.

Figure 19:
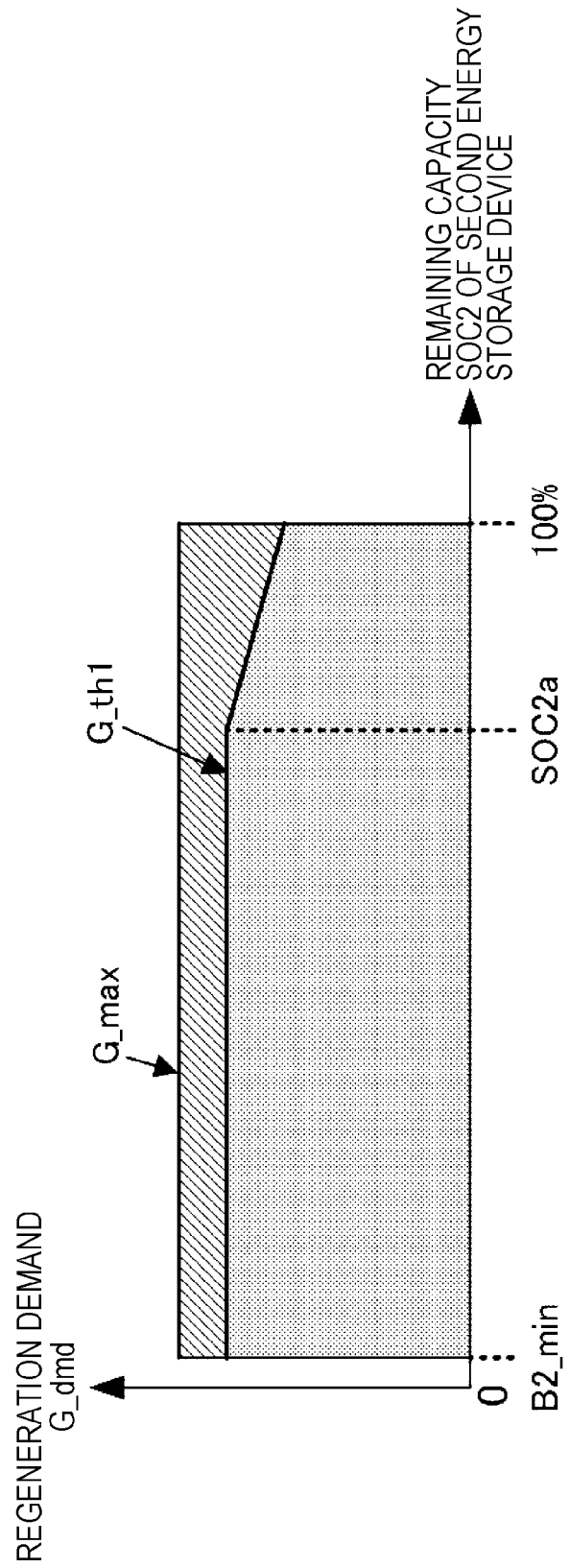
FIG. 19 illustrates a map for the process illustrated in FIG. 18.

FIG. 19 illustrates a visual representation of the map. On the map, a shaded area within which the regeneration demand G_dmd is less than or equal to a predetermined threshold value G_th1 represents an area within which only the second energy storage device 3 is charged (an area within which Pc1=0 holds), and a diagonally hatched area within which the regeneration demand G_dmd is larger than the threshold value G_th1 represents an area within which both the first energy storage device 2 and the second energy storage device 3 are charged.

The threshold value G_th1 is a threshold value set in accordance with the detected value of the second remaining capacity SOC2. In the illustrated example, the threshold value G_th1 is a predetermined constant value (fixed value) in an area within which the second remaining capacity SOC2 is less than or equal to a predetermined value SOC2a, and is set to decrease in accordance with an increase in the second remaining capacity SOC2 in an area within which the second remaining capacity SOC2 is larger than the predetermined value SOC2a. The threshold value G_th1 in the area within which the second remaining capacity SOC2 is less than or equal to the predetermined value SOC2a is set to a value near a maximum value G max of the regeneration demand G_dmd.

In STEP52, when the combination of the detected value of the second remaining capacity SOC2 and the regeneration demand G_dmd falls within the shaded area, the target input Pc1 of the first energy storage device 2 is set to zero and the regeneration demand G_dmd is set as the target input Pc2 of the second energy storage device 3. Accordingly, if the regeneration demand G_dmd is smaller than the threshold value G_th1, the target inputs Pc1 and Pc2 are set so that only the second energy storage device 3 is charged with regenerative power.

When the combination of the detected value of the second remaining capacity SOC2 and the regeneration demand G_dmd falls within the diagonally hatched area, a regenerative value that coincides with the threshold value G_th1 is set as the target input Pc2 of the second energy storage device 3 and the residual regenerative value, which is obtained by subtracting the target input Pc2 of the second energy storage device 3 from the regeneration demand G_dmd, is set as the target input Pc1 of the first energy storage device 2.

Accordingly, when the regeneration demand G_dmd is larger than the threshold value G_th1 and when the detected value of the second remaining capacity SOC2 is larger than the predetermined value SOC2a, the target inputs Pc1 and Pc2 are set so that the ratio of the target input Pc2 of the second energy storage device 3 to the regeneration demand G_dmd decreases as the detected value of the second remaining capacity SOC2 increases (in other words, so that the ratio of the target input Pc1 of the first energy storage device 2 to the regeneration demand G_dmd increases as the detected value of the second remaining capacity SOC2 increases).

Then, in STEP53, the power transmission controller 41 determines whether or not the regeneration demand G_dmd is larger than the threshold value G_th1.

The determination result of STEP53 is affirmative within the diagonally hatched area illustrated in FIG. 19. In this situation, in STEP54, the power transmission controller 41 controls the power transmission circuit unit 11 so that the first energy storage device 2 and the second energy storage device 3 are charged with the target inputs Pc1 and Pc2, respectively.

The processing of STEP54 can be, specifically, executed in the following way, for example. A target value for the output voltage of the inverter 17 (=the input voltages of the voltage converters 15 and 16) is set in accordance with the detected value of the rotational speed of the electric motor 100 or the like. In addition, the target input Pc1 is set as the target value for the output power from the voltage converter 15 to the first energy storage device 2, and the target input Pc2 is set as the target value for the output power from the voltage converter 16 to the second energy storage device 3.

Further, the inverter 17 is controlled so as to realize the target value for the output voltage of the inverter 17. Also, the voltage converters 15 and 16 are controlled so as to realize the target value for the output power from the voltage converter 15 to the first energy storage device 2 and the target value for the output power from the voltage converter 16 to the second energy storage device 3.

On the other hand, the determination result of STEP53 is negative within the shaded area illustrated in FIG. 19. In this situation, in STEP55, the power transmission controller 41 controls the power transmission circuit unit 11 so that only the second energy storage device 3 is charged with the target input Pc2.

The processing of STEP55 can be, specifically, executed in the following way, for example. A target value for the output voltage of the inverter 17 (=the input voltage of the voltage converter 16) is set in accordance with the detected value of the rotational speed of the electric motor 100 or the like. In addition, the target input Pc2 is set as the target value for the output power from the voltage converter 16 to the second energy storage device 3.

Further, the inverter 17 is controlled so as to realize the target value for the output voltage of the inverter 17. Also, the voltage converter 16 is controlled so as to realize the target value for the output power from the voltage converter 16 to the second energy storage device 3.

Furthermore, the voltage converter 15 is controlled to be in power supply interruption state. Alternatively, the contactor 12 on the first energy storage device 2 side is controlled to be turned off. This prohibits discharging from the first energy storage device 2.

In the way described above, the control process for the power transmission controller 41 during the regenerative operation of the electric motor 100 is executed.

The control process for the power transmission controller 41 during the regenerative operation is executed in the way described above, thereby allowing regenerative power to be supplied to basically charge the second energy storage device 3. Only an excess of regenerative power used to charge the second energy storage device 3 (a regenerative value exceeding the threshold value G_th1) is used to charge the first energy storage device 2.

This allows the second remaining capacity SOC2 to be kept in the medium-remaining-capacity area or at a nearby remaining capacity value while minimizing the occurrence of a situation in which the second energy storage device 3 needs to be charged with power supplied by the first energy storage device 2.

In addition, the first energy storage device 2 is typically low in resistance to charging at high rates (high-speed charging in which the charging power per unit time is large). The regenerative value for the first energy storage device 2 is reduced as much as possible, which can prevent as much as possible deterioration of the first energy storage device 2.

The correspondence between components illustrated in the first embodiment described above and components disclosed herein will be briefly explained below.

In this embodiment, the regeneration demand G_dmd during the regenerative operation of the electric motor 100 (electric load) corresponds to a regeneration index value disclosed herein. The threshold value G_th1 for the regeneration demand G_dmd corresponds to an A-th threshold value disclosed herein. The predetermined value SOC2$a$ for the second remaining capacity SOC2 corresponds to a first threshold value disclosed herein.

Second Embodiment

Next, a second embodiment of the present disclosure will be described with reference to FIG. 20 and FIG. 21. This embodiment is the same or substantially the same as the first embodiment, except for a control process performed during the regenerative operation of the electric motor 100. Thus, the same or substantially the same portions as those in the first embodiment are not described herein.

Figure 20:
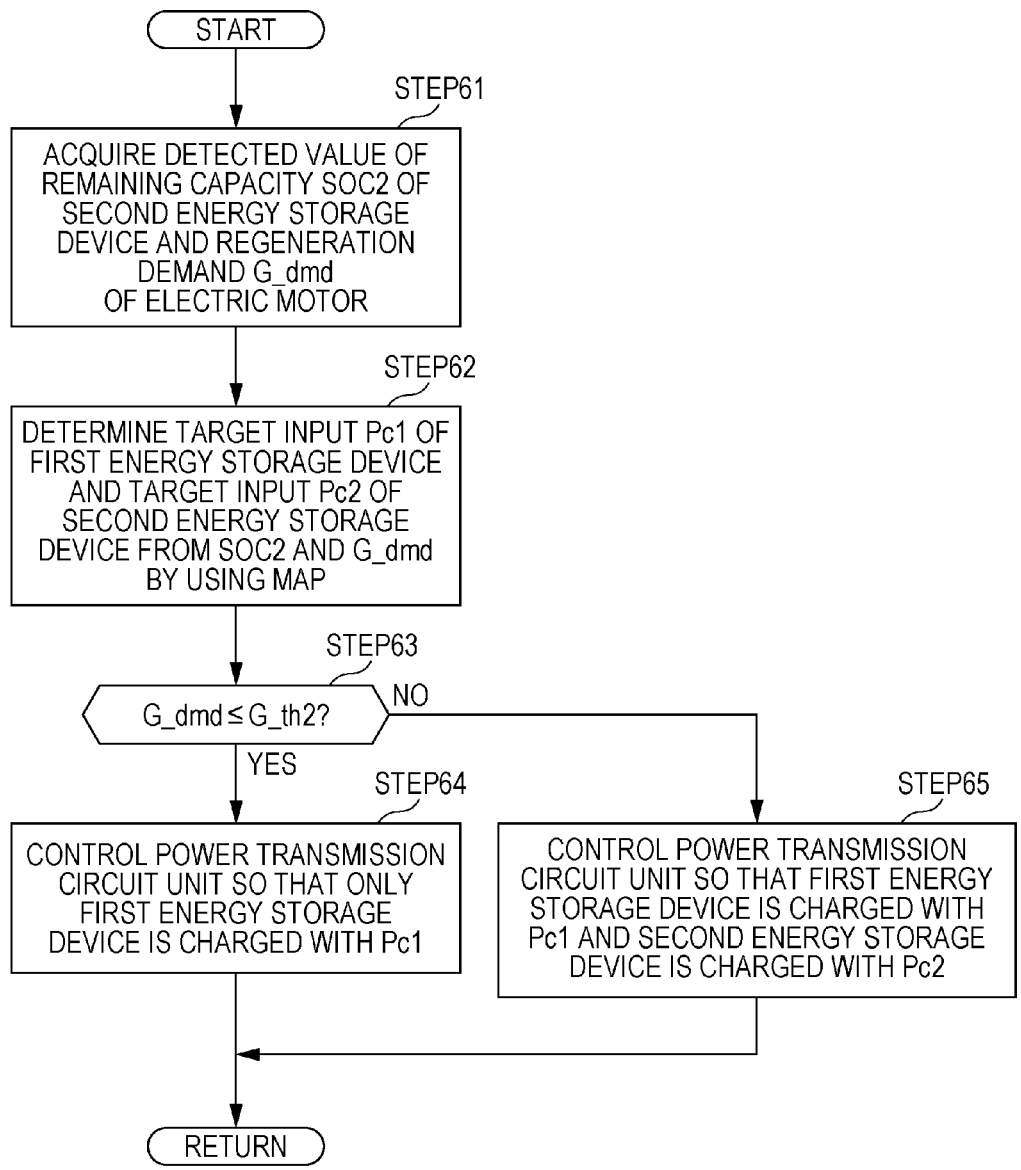
FIG. 20 is a flowchart illustrating a control process for the control device during the regenerative operation of the electric motor (second embodiment).

In this embodiment, the control process for the power transmission controller 41 during the regenerative operation of the electric motor 100 is executed at intervals of a predetermined control process period in a way illustrated in a flowchart in FIG. 20.

Specifically, in STEP61, the power transmission controller 41 acquires a detected value of the second remaining capacity SOC2 and a regeneration demand G_dmd of the electric motor 100. The processing of STEP61 is the same or substantially the same as the processing of STEP51 in the first embodiment.

Then, in STEP62, the power transmission controller 41 determines the respective target inputs Poi_ and Pc2 (target charging powers) of the first energy storage device 2 and the second energy storage device 3 from the detected value of the second remaining capacity SOC2 and the regeneration demand G_dmd of the electric motor 100 on the basis of a map created in advance.

Figure 21:
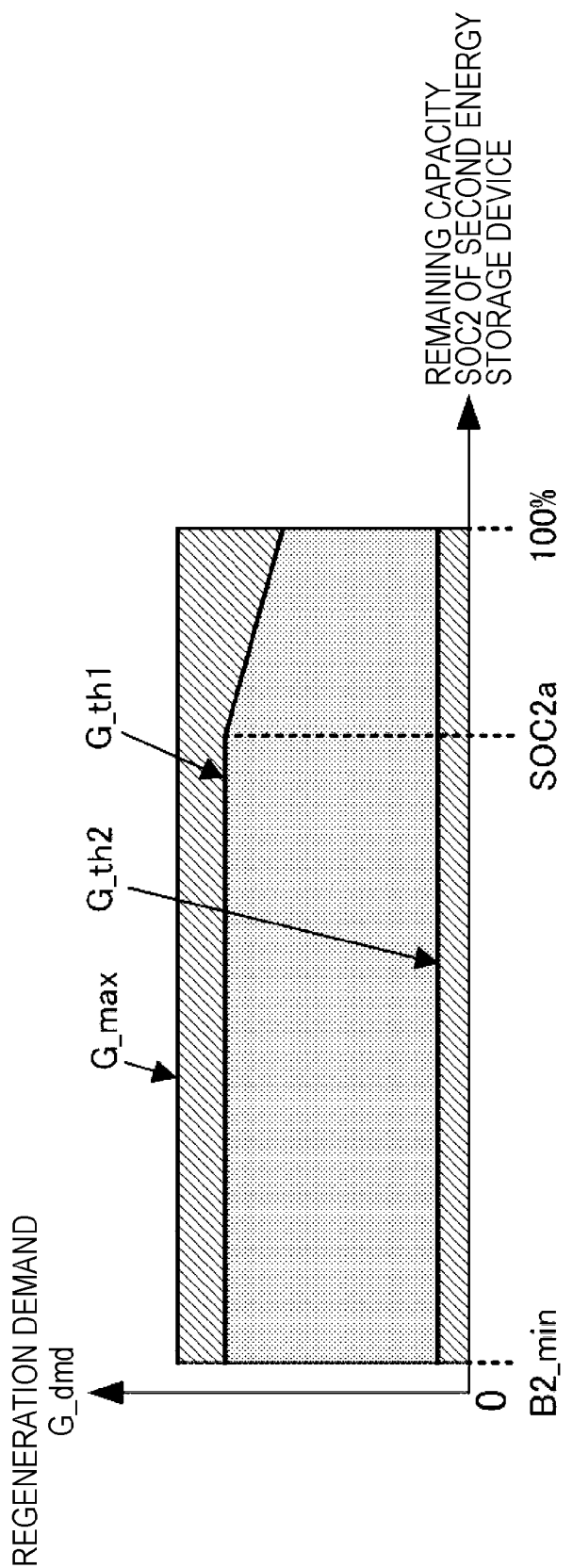
FIG. 21 illustrates a map for the process illustrated in FIG. 20 (or FIG. 22).

FIG. 21 illustrates a visual representation of the map in this embodiment. On the map, a diagonally hatched area within which the regeneration demand G_dmd is less than or equal to a predetermined threshold value G_th2 represents an area within which only the first energy storage device 2 is charged (an area within which Pc2=0 holds), and a shaded area within which the regeneration demand G_dmd is larger than the threshold value G_th2 and is less than or equal to a predetermined threshold value G_th1 and a diagonally hatched area within which the regeneration demand G_dmd is larger than the threshold value G_th1 represent an area within which both the first energy storage device 2 and the second energy storage device 3 are charged.

Of the threshold values G_th1 and G_th2, the threshold value G_th1 is a threshold value set in accordance with the detected value of the second remaining capacity SOC2, as in the first embodiment.

In this embodiment, the threshold value G_th2 is a predetermined constant value that has been determined in advance. The threshold value G_th2 is a comparatively small value (a near-zero value).

In STEP62, when the combination of the detected value of the second remaining capacity SOC2 and the regeneration demand G_dmd falls within the bottom diagonally hatched area, the target input Pc2 of the second energy storage device 3 is set to zero and the regeneration demand G_dmd is set as the target input Pc1 of the first energy storage device 2.

Accordingly, the target inputs Pc1 and Pc2 are set so that only the first energy storage device 2 is charged with regenerative power.

When the combination of the detected value of the second remaining capacity SOC2 and the regeneration demand G_dmd falls within the shaded area, a regenerative value that coincides with the threshold value G_th2 is set as the target input Pc1 of the first energy storage device 2 and the residual regenerative value, which is obtained by subtracting the target input Pc1 of the first energy storage device 2 from the regeneration demand G_dmd, is set as the target input Pc2 of the second energy storage device 3.

When the combination of the detected value of the second remaining capacity SOC2 and the regeneration demand G_dmd falls within the top diagonally hatched area, a supplied power that coincides with the threshold value G_th1 is set as the target input Pc2 of the second energy storage device 3 and the residual regenerative value, which is obtained by subtracting the target input Pc2 of the second energy storage device 3 from the regeneration demand G_dmd, is set as the target input Pc1 of the first energy storage device 2.

Then, in STEP63, the power transmission controller 41 determines whether or not the regeneration demand G_dmd is less than or equal to the threshold value G_th2.

The determination result of STEP63 is affirmative within the bottom diagonally hatched area illustrated in FIG. 21. In this situation, in STEP64, the power transmission controller 41 controls the power transmission circuit unit 11 so that only the first energy storage device 2 is charged with the target input Pc1.

The processing of STEP64 can be, specifically, executed in the following way, for example. A target value for the output voltage of the inverter 17 (=the input voltage of the voltage converter 15) is set in accordance with the detected value of the rotational speed of the electric motor 100 or the like. In addition, the target input Pc1 is set as the target value for the output power from the voltage converter 15 to the first energy storage device 2.

Further, the inverter 17 is controlled so as to realize the target value for the output voltage of the inverter 17. Also, the voltage converter 15 is controlled so as to realize the target value for the output power from the voltage converter 15 to the first energy storage device 2.

Furthermore, the voltage converter 16 is controlled to be in power supply interruption state. Alternatively, the contactor 13 on the second energy storage device 3 side is controlled to be turned off. This prohibits discharging from the second energy storage device 3.

On the other hand, the determination result of STEP63 is negative within the shaded area or the top diagonally hatched area illustrated in FIG. 21. In this situation, in STEP65, the power transmission controller 41 controls the power transmission circuit unit 11 so that the first energy storage device 2 and the second energy storage. device 3 are charged with the target inputs Pc1 and Pc2, respectively.

In this case, specific control of the power transmission circuit unit 11 can be performed in a manner similar to that in the processing of STEP54 in the first embodiment.

In this embodiment, the control process for the power transmission controller 41 during the regenerative operation of the electric motor 100 is executed in the way described above.

The control process for the power transmission controller 41 during the regenerative operation is executed in the way described above, thereby allowing a small amount of regenerative power less than or equal to the threshold value G_th2 to be supplied to charge the first energy storage device 2, except for the case where the regeneration demand G_dmd is larger than the threshold value G_th1. In this case, since the charging power used to charge the first energy storage device 2 is small, the first energy storage device 2 can be charged at a low charging rate (low rate). This allows the first energy storage device 2 to be charged while preventing the progress of deterioration of the first energy storage device 2 during the regenerative operation. Hence, the drivable range of the vehicle can be extended.

In addition, an amount of regenerative power exceeding the threshold value G_th2 is supplied to charge the second energy storage device 3. This allows the second remaining capacity SOC2 to be kept in the medium-remaining-capacity area or at a nearby remaining capacity value while reducing the occurrence of the situation in which the second energy storage device 3 needs to be charged with power supplied by the first energy storage device 2.

A brief description will now be given of the correspondence between components illustrated in the second embodiment and components disclosed herein.

In this embodiment, the regeneration demand G_dmd during the regenerative operation of the electric motor 100 (electric load) corresponds to a regeneration index value disclosed herein. The threshold value G_th1 for the regeneration demand G_dmd corresponds to an A-th threshold value disclosed herein, and threshold value G_th2 corresponds to a B-th threshold value disclosed herein. In addition, the predetermined value SOC2a for the second remaining capacity SOC2 corresponds to a first threshold value disclosed herein.

Third Embodiment

Next, a third embodiment of the present disclosure will be described with reference to FIG. 22. This embodiment is the same or substantially the same as the second embodiment, except for a control process performed during the regenerative operation of the electric motor 100. Thus, the same or substantially the same portions as those in the first embodiment are not described herein.

In this embodiment, the control process for the power transmission controller 41 during the regenerative operation of the electric motor 100 is executed at intervals of a predetermined control process period in a way illustrated in a flowchart in FIG. 22.

Specifically, in STEP71, the power transmission controller 41 acquires a detected value of the second remaining capacity SOC2 and a regeneration demand G_dmd of the electric motor 100. The processing of STEP71 is the same or substantially the same as the processing of STEP51 in the first embodiment.

Then, in STEP72, the power transmission controller 41 determines the respective target inputs Pc1 and Pc2 (target charging powers) of the first energy storage device 2 and the second energy storage device 3 from the detected value of the second remaining capacity SOC2 and the regeneration demand G_dmd of the electric motor 100 on the basis of a map created in advance.

In this case, the map used in this embodiment (how areas are separated by the threshold values G_th1 and G_th2) is the same or substantially the same as that in the second embodiment (illustrated in FIG. 21). In this embodiment, however, the energy storage device to be charged in the shaded area within which the regeneration demand G_dmd is larger than the threshold value G_th2 and is less than or equal to the threshold value G_th1 is different from that in the second embodiment.

In this embodiment, the shaded area illustrated in FIG. 21 is an area within which only the second energy storage device 3 is charged. When the combination of the detected value of the second remaining capacity SOC2 and the regeneration demand G_dmd falls within the shaded area illustrated in FIG. 21, the target input Pc1 of the first energy storage device 2 is set to zero and the regeneration demand G_dmd is set as the target input Pc2 of the second energy storage device 3.

The method of setting the target inputs Pc1 and Pc2 within the bottom diagonally hatched area and the top diagonally hatched area illustrated in FIG. 21 is the same or substantially the same as that in the second embodiment.

Then, in STEP73, the power transmission controller 41 determines whether or not the regeneration demand G_dmd is less than or equal to the threshold value G_th2.

The determination result of STEP73 is affirmative within the bottom diagonally hatched area illustrated in FIG. 21. In this situation, in STEP74, the power transmission controller 41 controls the power transmission circuit unit 11 so that only the first energy storage device 2 is charged with the target input Pct.

In this case, specific control of the power transmission circuit unit 11 can be performed in a manner similar to that in the processing of STEP64 in the second embodiment.

On the other hand, when the determination result of STEP73 is negative, then, in STEP75, the power transmission controller 41 further determines whether or not the regeneration demand G_dmd is larger than the threshold value G_th1.

The determination result of STEP75 is affirmative within the top diagonally hatched area illustrated in FIG. 21. In this situation, in STEP76, the power transmission controller 41 controls the power transmission circuit unit 11 so that the first energy storage device 2 and the second energy storage device 3 are charged with the target inputs Pc1 and Pc2, respectively.

In this case, specific control of the power transmission circuit unit 11 can be performed in a manner similar to that in the processing of STEP54 in the first embodiment.

The determination result of STEP75 is negative within the shaded area illustrated in FIG. 21. In this case, in STEP77, the power transmission controller 41 controls the power transmission circuit unit 11 so that only the second energy storage device 3 is charged with the target input Pc2.

In this case, specific control of the power transmission circuit unit 11 can be performed in a manner similar to that in the processing of STEP55 in the first embodiment.

In this embodiment, the control process for the power transmission controller 41 during the regenerative operation of the electric motor 100 is executed in the way described above.

The control process for the power transmission controller 41 during the regenerative operation is executed in the way described above, thereby allowing, when the regeneration demand G_dmd is a small regenerative value less than or equal to the threshold value G_th2, the small regenerative value to be supplied to charge the first energy storage device 2. In this case, as in the second embodiment, the first energy storage device 2 can be charged slowly at a low charging rate. This allows the first energy storage device 2 to be charged while preventing the progress of deterioration of the first energy storage device 2. Hence, the drivable range of the vehicle can be extended.

When the regeneration demand G_dmd is larger than the threshold value G_th2, regenerative power corresponding to the regeneration demand G_dmd is supplied to charge only the second energy storage device 3 so long as the threshold value G_th1 is not exceeded. In this case, even if the second energy storage device 3 is not charged at a low charging rate, the progress of deterioration of the second energy storage device 3 is less likely to occur. This can facilitate rapid charging of the second energy storage device 3. This enables the power transmission circuit unit 11 to be controlled with high stability during the regenerative operation.

The correspondence between components illustrated in this embodiment and components disclosed herein are the same as those in the first embodiment.

As a supplementary explanation, in the second or third embodiment, when the regeneration demand G_dmd is larger than the threshold value G_th1, a regenerative value corresponding to the difference between the threshold value G_th1 and the threshold value G_th2 (a regenerative value corresponding to the difference obtained by subtracting a regenerative value that coincides with the threshold value G_th2 from a regenerative value that coincides with the threshold value G_th1) may be set as the target input Pc2 of the second energy storage device 3 and the residual regenerative value, which is obtained by subtracting the target input Pc2 of the second energy storage device 3 from the regeneration demand G_dmd, may be set as the target input Pc1 of the first energy storage device 2.

Modifications

There will now be described some modifications to the first to third embodiments described above.

The embodiments described above provide the power supply system 1, which is configured to control the power transmission circuit unit 11 by using three control modes, namely, the first to third control modes. The number of control modes of the power transmission circuit unit 11 may be two or more than three. Alternatively, the power supply system 1 may be configured to control the power transmission circuit unit 11 by using only one of the first to third control modes.

In different control modes, only one of the base supplied power P1_base and the threshold value B2_th1 related to the second remaining capacity may be different. For example, a control mode in which only one of the maximum value Fib of the base supplied power P1_base and the threshold value B2_th1 is different from that in the first control mode may be additionally used or may be used in place of the second control mode or the third control mode.

The extended-stop control process may be omitted.

In the embodiments described above, furthermore, the driving force demand DT_dmd of the electric motor 100 is used as the output demand of the electric motor 100 (electric load). Alternatively, for example, an amount of energy to be supplied to the electric motor 100 per unit time in response to the driving force demand DT_dmd or a request value for the current flowing through the electric motor 100 (the request value for the amount of charge per unit time) which corresponds to the driving force demand DT_dmd may be used as the output demand of the electric motor 100 (electric load).

In the embodiments described above, furthermore, the regeneration demand G_dmd of the electric motor 100 is used as a regeneration index value. However, for example, a braking force demand during the regenerative operation of the electric motor 100 or a request value for the current flowing through the electric motor 100 which corresponds to the braking force demand may be used as a regeneration index value.

In addition, the ratio of the respective charging powers used to charge the first energy storage device 2 and the second energy storage device 3 during the regenerative operation of the electric motor 100 may be adjusted in accordance with only one of the first remaining capacity SOC1 and the second remaining capacity SOC2.

In the embodiments described above, furthermore, the electric load is the electric motor 100, by way of example but not limited. The electric load may be an electric load other than the electric motor 100 so long as the electric load is capable of outputting regenerative power.

In addition, a transportation device in which the power supply system 1 is mounted is not limited to an electrically driven vehicle. The transportation device may be a hybrid vehicle, for example, or may be a ship, a railway vehicle, or any other device.

According to an aspect of the present disclosure includes a first energy storage device, a second energy storage device having a higher power density and a lower energy density than the first energy storage device, a power transmission circuit unit, and a control device configured to have a function of controlling the power transmission circuit unit (a first aspect of the present disclosure). The power transmission circuit unit is disposed in a power transmission path among an electric load, the first energy storage device, and the second energy storage device. The electric load is activated upon being supplied with power from at least one of the first energy storage device and the second energy storage device, and is configured to output a regenerative power while no power is supplied to the electric load. The power transmission circuit unit is configured to be capable of controlling power transmission among the electric load, the first energy storage device, and the second energy storage device in accordance with a given control signal. The control device is configured to acquire at least one of a regeneration index value or a second remaining capacity, the regeneration index value indicating a magnitude of the regenerative power, the second remaining capacity being a remaining capacity of the second energy storage device, and to have a function of controlling the power transmission circuit unit to change proportions of a charging power used to charge the first energy storage device and a charging power used to charge the second energy storage device in the regenerative power output from the electric load in accordance with at least one of the regeneration index value or the second remaining capacity.

Certain terms as used herein will be briefly explained below. The term "charging power" refers to an amount of electricity used to charge the first energy storage device or the second energy storage device, and the term "regenerative power" refers to an amount of electricity output from an electric load as a result of a regenerative operation of the electric load. The "electricity", the "charging power", and the "regenerative power" are each expressed as an amount of electrical energy per unit time (e.g., a value of (electric) power) or as an amount of charge per unit time (e.g., a value of current), for example.

The term "regeneration index value" refers to an index value that increases in accordance with an increase in regenerative power. The "regeneration index value" may be a value of regenerative power itself, or any other parameter value. For example, if the electric load is an electric motor, a braking force (regenerative braking force) generated by the electric motor during regenerative operation can be used as the "regeneration index value".

The "charging power corresponding to a certain threshold value" for a regeneration index value refers to an amount of charging power (an amount of electricity) having a magnitude identical to the threshold value.

Furthermore, what is meant by the "power transmission circuit unit" which is capable of controlling power transmission among the electric load, the first energy storage device, and the second energy storage device is that the "power transmission circuit unit" at least has a function of being capable of controlling the amount of electricity to be exchanged between the electric load and each of the first energy storage device and the second energy storage device.

Based on the terms defined above, exemplary embodiments of the present disclosure will now be described.

The first aspect of the present disclosure allows the proportions of a charging power used to charge the first energy storage device and a charging power used to charge the second energy storage device in the regenerative power output from the electric load to change in accordance with at least one of the regeneration index value or the second remaining capacity. This allows the proportions of the charging powers to be changed in such a manner that the magnitude of the regenerative power or the state of the second remaining capacity is taken into account.

Accordingly, the first aspect of the present disclosure allows two energy storage devices to be charged in an appropriate manner by using a regenerative power generated by the electric load.

In the first aspect of the present disclosure, preferably, the control device is configured to have a function of controlling the power transmission circuit unit so that the proportion of the charging power used to charge the second energy storage device in the regenerative power decreases as the second remaining capacity increases (a second aspect of the present disclosure).

This can prevent the second energy storage device to be charged with an excessively amount of power in the regenerative power, in particular, when the second remaining capacity is comparatively large. Hence, the progress of deterioration of the second energy storage device can be prevented.

In the second aspect of the present disclosure, the control device may be configured to control the power transmission circuit unit so that the proportion of the charging power used to charge the second energy storage device in the regenerative power decreases as the second remaining capacity increases, under a condition that the second remaining capacity is greater than or equal to a predetermined first threshold value (a third aspect of the present disclosure).

Accordingly, when the second remaining capacity is smaller than the first threshold value (when the second remaining capacity is comparatively small), the proportion of charging power used to charge the second energy storage device in the regenerative power can be made larger than that when the second remaining capacity is larger than the first threshold value. This allows the second energy storage device to be charged so as to prevent an excessive decrease in the second remaining capacity.

In the second or third aspect of the present disclosure, the control device may be configured to control the power transmission circuit unit so that the proportion of the charging power used to charge the second energy storage device in the regenerative power decreases as the second remaining capacity increases, under a condition that the regeneration index value is greater than or equal to a predetermined A-th threshold value (a fourth aspect of the present disclosure).

This can effectively achieve, if necessary, a situation in which the second energy storage device is prevented from being excessively charged with regenerative power.

In the fourth aspect of the present disclosure, preferably, the A-th threshold value is a threshold value set in response to a detection of the second remaining capacity so as to decrease as the second remaining capacity increases. Preferably, the control device is configured to control the power transmission circuit unit to, when the regeneration index value is larger than the A-th threshold value, charge the second energy storage device with a charging power corresponding to the A-th threshold value in the regenerative power and charge the first energy storage device with a residual charging power in the regenerative power (a fifth aspect of the present disclosure).

The residual charging power in the regenerative power refers to a charging power obtained by subtracting the charging power used to charge the second energy storage device from the regenerative power.

When the regeneration index value is larger than the A-th threshold value, the proportion of the charging power used to charge the second energy storage device in the regenerative power can be appropriately reduced as the second remaining capacity increases. Since only a surplus regenerative power exceeding the charging power corresponding to the A-th threshold value in the regenerative power is supplied to charge the first energy storage device, the charging power used to charge the first energy storage device can be reduced to a small value.

This can prevent the progress of deterioration of the first energy storage device while preventing the second energy storage device from being excessively charged.

In the fourth or fifth aspect of the present disclosure, the control device may be configured to charge only the second energy storage device with the regenerative power when the regeneration index value is smaller than the A-th threshold value (a sixth aspect of the present disclosure).

This allows the second energy storage device to be effectively charged so as to prevent an excessive decrease in the second remaining capacity. Since the first energy storage device is not charged when the regeneration index value is smaller than the A-th threshold value, the first energy storage device is prevented from being frequently charged. This can prevent the progress of deterioration of the first energy storage device.

In the fourth or fifth aspect of the present disclosure, the control device may be configured to control the power transmission circuit unit to charge only the first energy storage device with the regenerative power when the regeneration index value is smaller than a predetermined B-th threshold value smaller than the A-th threshold value (a seventh aspect of the present disclosure).

When the regeneration index value is smaller than the B-th threshold value, the regenerative power is small. Thus, the first energy storage device can be charged at a low speed (low rate). Accordingly, the seventh aspect of the present disclosure allows the remaining capacity of the first energy storage device to be recovered by using the regenerative power while appropriately prevent the progress of deterioration of the first energy storage device.

In the seventh aspect of the present disclosure, the control device may be configured to control the power transmission circuit unit to, when the regeneration index value falls within a range between the A-th threshold value and the B-th threshold value, charge the first energy storage device with a charging power corresponding to the B-th threshold value in the regenerative power and charge the second energy storage device with a residual charging power in the regenerative power (an eighth aspect of the present disclosure).

Accordingly, when the regeneration index value falls within a range between the A-th threshold value and the B-th threshold value, both the first energy storage device and the second energy storage device can be charged by using the regenerative power. Since the charging power used to charge the first energy storage device is kept at a comparatively small charging power which corresponds to the B-th threshold value, the progress of deterioration of the first energy storage device can be appropriately prevented.

In the seventh aspect of the present disclosure, furthermore, the control device may be configured to control the power transmission circuit unit to charge only the second energy storage device with the regenerative power when the regeneration index value falls within a range between the A-th threshold value and the B-th threshold value (a ninth aspect of the present disclosure).

Accordingly, when the regeneration index value falls within a range between the A-th threshold value and the B-th threshold value, the regenerative power is supplied to charge only the second energy storage device. This enables the power transmission circuit unit to be controlled with high stability. This also allows the second energy storage device to be effectively charged so as to prevent an excessive decrease in the second remaining capacity.

In the first aspect of the present disclosure, furthermore, the control device may be configured to control the power transmission circuit unit to charge only the first energy storage device with the regenerative power when the regeneration index value is smaller than a predetermined B-th threshold value (a tenth aspect of the present disclosure).

Accordingly, when the regeneration index value is smaller than the B-th threshold value, as in the seventh aspect of the present disclosure, the first energy storage device can be charged at a low speed (low rate). This allows the remaining capacity of the first energy storage device to be recovered by using the regenerative power while appropriately prevent the progress of deterioration of the first energy storage device.

In the tenth aspect of the present disclosure, the control device may be configured to control the power transmission circuit unit to, when the regeneration index value falls within a range between the B-th threshold value and a predetermined A-th threshold value larger than the B-th threshold value, charge the first energy storage device with a charging power corresponding to the B-th threshold value in the regenerative power and charge the second energy storage device with a residual charging power in the regenerative power (an eleventh aspect of the present disclosure).

Accordingly, as in the eighth aspect of the present disclosure, when the regeneration index value falls within a range between the A-th threshold value and the B-th threshold value, both the first energy storage device and the second energy storage device can be charged by using the regenerative power. Since the charging power used to charge the first energy storage device is kept at a comparatively small charging power which corresponds to the B-th threshold value, the progress of deterioration of the first energy storage device can be appropriately prevented.

In the tenth aspect of the present disclosure, furthermore, the control device may be configured to control the power transmission circuit unit to charge only the second energy storage device with the regenerative power when the regeneration index value falls within a range between the B-th threshold value and a predetermined A-th threshold value larger than the B-th threshold value (a twelfth aspect of the present disclosure).

Accordingly, as in the ninth aspect of the present disclosure, when the regeneration index value falls within a range between the A-th threshold value and the B-th threshold value, the regenerative power is supplied to charge only the second energy storage device. This enables the power transmission circuit unit to be controlled with high stability. This also allows the second energy storage device to be effectively charged so as to prevent an excessive decrease in the second remaining capacity.

In the eleventh or twelfth aspect of the present disclosure, the control device may be configured to control the power transmission circuit unit to, when the regeneration index value is larger than the A-th threshold value, charge the second energy storage device with a charging power corresponding to the A-th threshold value in the regenerative power and charge the first energy storage device with a residual charging power in the regenerative power (a thirteenth aspect of the present disclosure).

Alternatively, in the eleventh or twelfth aspect of the present disclosure, the control device may be configured to control the power transmission circuit unit to, when the regeneration index value is larger than the A-th threshold value, charge the second energy storage device with a charging power equal to a difference between the A-th threshold value and the B-th threshold value in the regenerative power and charge the first energy storage device with a residual charging power in the regenerative power (a fourteenth aspect of the present disclosure).

In the thirteenth or fourteenth aspect of the present disclosure, the residual charging power in the regenerative power refers to a charging power obtained by subtracting the charging power used to charge the second energy storage device from the regenerative power.

In the fourteenth aspect of the present disclosure, the charging power equal to the difference between the A-th threshold value and the B-th threshold value in the regenerative power refers to a charging power equal to a difference obtained by subtracting the charging power corresponding to the B-th threshold value from the charging power corresponding to the A-th threshold value.

According to the thirteenth or fourteenth aspect of the present disclosure, when the regeneration index value is larger than the A-th threshold value, the first energy storage device is charged only with a regenerative power exceeding the charging power corresponding to the A-th threshold value in the regenerative power (the thirteenth aspect of the present disclosure), or the first energy storage device is charged only with the residual charging power except for the charging power equal to the difference between the A-th threshold value and the B-th threshold value in the regenerative power (the fourteenth aspect of the present disclosure). This allows the charging power used to charge the first energy storage device can be reduced to a small value.

This can prevent the progress of deterioration of the first energy storage device while preventing the first energy storage device from being excessively charged.

In the thirteenth or fourteenth aspect of the present disclosure, preferably, the A-th threshold value is a threshold value set in response to a detection of the second remaining capacity so as to decrease as the second remaining capacity increases (a fifteenth aspect of the present disclosure).

Accordingly, when the regeneration index value is larger than the A-th threshold value, the proportion of the charging power used to charge the second energy storage device in the regenerative power can be reduced as the second remaining capacity increases. This can prevent the second energy storage device from being excessively charged.

In the first to fifteenth aspects of the present disclosure, preferably, the control device is configured to control the power transmission circuit unit to, while only one of the first energy storage device and the second energy storage device is charged with the regenerative power, prohibit another of the first energy storage device and the second energy storage device from being discharged (a sixteenth aspect of the present disclosure).

Accordingly, while the regenerative power is supplied to charge only one of the first energy storage device and the second energy storage device, the energy loss caused by discharging of the other energy storage device can be prevented from occurring.

In the first to sixteenth aspects of the present disclosure described above, the electric load may be, for example, an electric motor (a seventeenth aspect of the present disclosure).

In the seventeenth aspect of the present disclosure, preferably, the power transmission circuit unit includes a voltage converter that converts an output voltage of at least one of the first energy storage device and the second energy storage device to produce a voltage and outputs the produced voltage, and an inverter that converts a direct-current power input from the first energy storage device, the second energy storage device, or the voltage converter into an alternating-current power and supplies the alternating-current power to the electric motor (an eighteenth aspect of the present disclosure).

This allows appropriate control of power transmission among an electric motor serving as the electric load, the first energy storage device, and the second energy storage device.

Further, a transportation device according to another aspect of the present disclosure includes the power supply system according to the first to eighteenth aspects of the present disclosure (a nineteenth aspect of the present disclosure). The transportation device is implementable as a transportation device that achieves the advantages described above with reference to the first to eighteenth aspects of the present disclosure.

Further, a power transmission method according to still another aspect of the present disclosure is a power transmission method for power transmission among an electric load, a first energy storage device, and a second energy storage device having a higher power density and a lower energy density than the first energy storage device in a power supply system, the power supply system including the first energy storage device and the second energy storage device and being configured to supply power from at least one of the first energy storage device and the second energy storage device to the electric load. The power transmission method includes the step of changing proportions of a charging power used to charge the first energy storage device and a charging power used to charge the second energy storage device in the regenerative power output from the electric load in accordance with at least one of a regeneration index value or a second remaining capacity, the regeneration index value indicating a magnitude of the regenerative power, the second remaining capacity being a remaining capacity of the second energy storage device (a twentieth aspect of the present disclosure).

Accordingly, as in the first aspect of the present disclosure, the proportions of the charging powers can be change in such a manner that the magnitude of the regenerative power or the state of the second remaining capacity is taken into account.

This allows two energy storage devices to be charged in an appropriate manner by using a regenerative power generated by the electric load.

Obviously, numerous modifications and variations of the present invention are possible in light of the above teachings. It is therefore to be understood that within the scope of the appended claims, the invention may be practiced otherwise than as specifically described herein.

What is claimed is:

1. A power supply system comprising:
    a first energy storage having a first power density and a first energy density;
    a second energy storage having a second power density higher than the first power density and having a second energy density lower than the first energy density;
    a power transmitter disposed among an electric load, the first energy storage, and the second energy storage so as to control power transmission among the electric load, the first energy storage, and the second energy storage, the electric load being activated with power supplied from at least one of the first energy storage and the second energy storage and being configured to output a regenerative power while no power is supplied to the electric load, the regenerative power including a first charging power used to charge in the first energy storage and a second charging power used to charge in the second energy storage; and
    circuitry configured to
        acquire a regeneration index value and a remaining capacity value, the regeneration index value indicating a magnitude of the regenerative power, the remaining capacity value indicating a remaining capacity of the second energy storage, and
        control the power transmitter to change a proportion of the first charging power and the second charging power in accordance with the regeneration index value and the remaining capacity value.

2. The power supply system according to claim 1, wherein the circuitry is configured to have a function of controlling the power transmitter so that the proportion of the second charging power used to charge the second energy storage in the regenerative power decreases as the remaining capacity value increases.

3. The power supply system according to claim 2, wherein the circuitry is configured to control the power transmitter so that the proportion of the second charging power used to charge the second energy storage in the regenerative power decreases as the remaining capacity value increases, under a condition that the remaining capacity value is greater than or equal to a predetermined first threshold value.

4. The power supply system according to claim 1, wherein the circuitry is configured to control the power transmitter to charge only the first energy storage with the regenerative power when the regeneration index value is smaller than a predetermined B-th threshold value.

5. The power supply system according to claim 4, wherein the circuitry is configured to control the power transmitter to charge only the second energy storage with the regenerative power when the regeneration index value falls within a range between the B-th threshold value and a predetermined A-th threshold value larger than the B-th threshold value.

6. The power supply system according to claim 1, wherein the circuitry is configured to control the power transmitter to, while only one of the first energy storage and the second energy storage is charged with the regenerative power, prohibit another of the first energy storage and the second energy storage from being discharged.

7. The power supply system according to claim 1, wherein the electric load comprises an electric motor.

8. The power supply system according to claim 7, wherein the power transmitter includes
    a voltage converter that converts an output voltage of at least one of the first energy storage and the second energy storage to produce a voltage and outputs the produced voltage, and
    an inverter that converts a direct-current power input from the first energy storage, the second energy storage, or the voltage converter into an alternating-current power and supplies the alternating-current power to the electric motor.

9. A transportation device comprising
    the power supply system according to claim 1.

10. The power supply system according to claim 1, wherein the circuitry is configured to charge only the second energy storage with the regenerative power when the regeneration index value is smaller than a predetermined A-th threshold value.

11. The power supply system according to claim 10, wherein the A-th threshold value includes a threshold value set in response to a detection of the remaining capacity value so as to decrease as the remaining capacity value increases.

12. A power supply system comprising:
    a first energy storage having a first power density and a first energy density;
    a second energy storage having a second power density higher than the first power density and having a second energy density lower than the first energy density;
    a power transmitter disposed among an electric load, the first energy storage, and the second energy storage so as to control power transmission among the electric load, the first energy storage, and the second energy storage, the electric load being activated with power supplied from at least one of the first energy storage and the second energy storage and being configured to output a regenerative power while no power is supplied to the electric load, the regenerative power including a first charging power used to charge in the first energy storage and a second charging power used to charge in the second energy storage; and
    circuitry configured to
        acquire at least one of a regeneration index value and a remaining capacity value, the regeneration index value indicating a magnitude of the regenerative power, the remaining capacity value indicating a remaining capacity of the second energy storage, and
        control the power transmitter to change a proportion of the first charging power and the second charging power in accordance with at least one of the regeneration index value and the remaining capacity value,
    wherein the circuitry is configured to have a function of controlling the power transmitter so that the proportion of the second charging power used to charge the second energy storage in the regenerative power decreases as the remaining capacity value increases, and wherein the circuitry is configured to control the power transmitter so that the proportion of the second charging power used to charge the second energy storage in the regenerative power decreases as the remaining capacity value increases, under a condition that the regeneration index value is greater than or equal to a predetermined A-th threshold value.

13. The power supply system according to claim 12, wherein the A-th threshold value includes a threshold value set in response to a detection of the remaining capacity value so as to decrease as the remaining capacity value increases, and
    wherein the circuitry is configured to control the power transmitter to, when the regeneration index value is larger than the A-th threshold value, charge the second energy storage with a charging power corresponding to the A-th threshold value in the regenerative power and charge the first energy storage with a residual charging power in the regenerative power.

14. The power supply system according to claim 12, wherein the circuitry is configured to charge only the second energy storage with the regenerative power when the regeneration index value is smaller than the A-th threshold value.

15. The power supply system according to claim 12, wherein the circuitry is configured to control the power transmitter to charge only the first energy storage with the regenerative power when the regeneration index value is smaller than a predetermined B-th threshold value smaller than the A-th threshold value.

16. The power supply system according to claim 15, wherein the circuitry is configured to control the power transmitter to, when the regeneration index value falls within a range between the A-th threshold value and the B-th threshold value, charge the first energy storage with a charging power corresponding to the B-th threshold value in the regenerative power and charge the second energy storage with a residual charging power in the regenerative power.

17. The power supply system according to claim 15, wherein the circuitry is configured to control the power transmitter to charge only the second energy storage with the regenerative power when the regeneration index value falls within a range between the A-th threshold value and the B-th threshold value.

18. A power supply system comprising:
    a first energy storage having a first power density and a first energy density;
    a second energy storage having a second power density higher than the first power density and having a second energy density lower than the first energy density;
    a power transmitter disposed among an electric load, the first energy storage, and the second energy storage so as to control power transmission among the electric load, the first energy storage, and the second energy storage, the electric load being activated with power supplied from at least one of the first energy storage and the second energy storage and being configured to output a regenerative power while no power is supplied to the electric load, the regenerative power including a first charging power used to charge in the first energy storage and a second charging power used to charge in the second energy storage; and
    circuitry configured to
        acquire at least one of a regeneration index value and a remaining capacity value, the regeneration index value indicating a magnitude of the regenerative power, the remaining capacity value indicating a remaining capacity of the second energy storage, and
        control the power transmitter to change a proportion of the first charging power and the second charging power in accordance with at least one of the regeneration index value and the remaining capacity value,
    wherein the circuitry is configured to control the power transmitter to charge only the first energy storage with the regenerative power when the regeneration index value is smaller than a predetermined B-th threshold value, and
    wherein the circuitry is configured to control the power transmitter to, when the regeneration index value falls within a range between the B-th threshold value and a predetermined A-th threshold value larger than the B-th threshold value, charge the first energy storage with a charging power corresponding to the B-th threshold value in the regenerative power and charge the second energy storage with a residual charging power in the regenerative power.

19. The power supply system according to claim 18, wherein the circuitry is configured to control the power transmitter to, when the regeneration index value is larger than the A-th threshold value, charge the second energy storage with a charging power corresponding to the A-th threshold value in the regenerative power and charge the first energy storage with a residual charging power in the regenerative power.

20. The power supply system according to claim 18, wherein the circuitry is configured to control the power transmitter to, when the regeneration index value is larger than the A-th threshold value, charge the second energy storage with a charging power equal to a difference between the A-th threshold value and the B-th threshold value in the regenerative power and charge the first energy storage with a residual charging power in the regenerative power.

21. The power supply system according to claim 19, wherein the A-th threshold value includes a threshold value set in response to a detection of the remaining capacity value so as to decrease as the remaining capacity value increases.

22. A power transmission method for power transmission among an electric load, a first energy storage, and a second energy storage, the power transmission method comprising:
    acquiring a regeneration index value and a remaining capacity value, the regeneration index value indicating a magnitude of a regenerative power of the electric load, the remaining capacity value indicating a remaining capacity of the second energy storage, the regenerative power including a first charging power used to charge in the first energy storage and a second charging power used to charge in the second energy storage; and
    changing a proportion of the first charging power and the second charging power in accordance with the regeneration index value and the remaining capacity value.

23. The power transmission method according to claim 22, further comprising charging only the second energy storage with the regenerative power when the regeneration index value is smaller than a predetermined A-th threshold value.

24. The power transmission method according to claim 23, wherein the A-th threshold value includes a threshold value set in response to a detection of the remaining capacity value so as to decrease as the remaining capacity value increases.

* * * * *